US012658193B2

(12) United States Patent
Dick et al.

(10) Patent No.: US 12,658,193 B2
(45) **Date of Patent: *Jun. 16, 2026**

(54) MULTI-CHANNEL AUDIO DECODER, MULTI-CHANNEL AUDIO ENCODER, METHODS AND COMPUTER PROGRAM USING A RESIDUAL-SIGNAL-BASED ADJUSTMENT OF A CONTRIBUTION OF A DECORRELATED SIGNAL

(71) Applicant: Fraunhofer-Gesellschaft zur Foerderung der angewandten Forschung e.V., Munich (DE)

(72) Inventors: Sascha Dick, Nuremberg (DE); Christian Helmrich, Erlangen (DE); Johannes Hilpert, Nuremberg (DE); Andreas Hoelzer, Erlangen (DE)

(73) Assignee: Fraunhofer-Gesellschaft zur Foerderung der angewandten Forschung e.V, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,722

(22) Filed: Aug. 25, 2020

(65) Prior Publication Data

US 2020/0388293 A1 Dec. 10, 2020

Related U.S. Application Data

(60) Continuation of application No. 15/784,332, filed on Oct. 16, 2017, now Pat. No. 10,755,720, which is a (Continued)

(30) Foreign Application Priority Data

| | | |
|---|---|---|
| Jul. 22, 2013 | (EP) | 13177375 |
| Oct. 18, 2013 | (EP) | 13189309 |
| Jul. 17, 2014 | (WO) | PCT/EP2014/065416 |

(51) Int. Cl.
*H04R 5/00* (2006.01)
*G10L 19/008* (2013.01)
(Continued)

(52) U.S. Cl.
CPC ............ *G10L 19/008* (2013.01); *G10L 19/22* (2013.01); *H04S 1/007* (2013.01); *H04S 3/02* (2013.01);
(Continued)

(58) Field of Classification Search
CPC ....... G10L 19/008; G10L 19/22; G10L 19/20; G10L 19/0017; G10L 19/005;
(Continued)

(56) References Cited

U.S. PATENT DOCUMENTS 5,717,764 A 2/1998 Johnston et al.
5,970,152 A 10/1999 Klayman
(Continued)

FOREIGN PATENT DOCUMENTS

CN 102037507 4/2011
CN 10 2074242 5/2011
(Continued)

OTHER PUBLICATIONS

"MPEG Surround—The ISO/MPEG Standard for Efficient and Compatible Multichannel Audio Coding" by Jurgen Herre et al, J. of AES, vol. 56, No. 11, November, p. 932-955 (Year: 2008).*
(Continued)

*Primary Examiner* — Leshui Zhang
(74) *Attorney, Agent, or Firm* — Dicke, Billig & Czaja, PLLC

(57) ABSTRACT

A multi-channel audio decoder for providing at least two output audio signals on the basis of an encoded representation is configured to perform a weighted combination of a downmix signal, a decorrelated signal and a residual signal,
(Continued)

to obtain one of the output audio signals. The multi-channel audio decoder is configured to determine a weight describing a contribution of the decorrelated signal in the weighted combination in dependence on the residual signal. A multi-channel audio encoder for providing an encoded representation of a multi-channel audio signal is configured to obtain a downmix signal on the basis of the multi-channel audio signal, to provide parameters describing dependencies between the channels of the multi-channel audio signal, and to provide a residual signal. The multi-channel audio encoder is configured to vary an amount of residual signal included into the encoded representation in dependence on the multi-channel audio signal.

6 Claims, 8 Drawing Sheets

Related U.S. Application Data division of application No. 15/167,085, filed on May 27, 2016, now Pat. No. 10,354,661, which is a continuation of application No. 15/004,571, filed on Jan. 22, 2016, now Pat. No. 10,839,812, which is a continuation of application No. PCT/EP2014/065416, filed on Jul. 17, 2014.

(51) Int. Cl.
*G10L 19/22* (2013.01)
*H04S 1/00* (2006.01)
*H04S 3/02* (2006.01)
*G10L 19/20* (2013.01)

(52) U.S. Cl.
CPC ........... *G10L 19/20* (2013.01); *H04S 2400/03* (2013.01); *H04S 2420/07* (2013.01)

(58) Field of Classification Search
CPC . G10L 19/00; H04S 1/007; H04S 1/00; H04S 3/02; H04S 3/00; H04S 2400/03; H04S 2420/07
USPC ................................ 381/1-23; 704/500-504
See application file for complete search history.

(56) References Cited

U.S. PATENT DOCUMENTS

| | | | |
|---|---|---|---|
| 7,573,912 | B2 | 8/2009 | Lindblom |
| 7,668,722 | B2 | 2/2010 | Villemoes et al. |
| 8,255,228 | B2 | 8/2012 | Hilpert et al. |
| 8,731,950 | B2 | 5/2014 | Herre et al. |
| 9,245,530 | B2 | 1/2016 | Herre et al. |
| 9,502,040 | B2 | 11/2016 | Kuntz et al. |
| 10,354,661 | B2 | 7/2019 | Dick et al. |
| 2004/0181399 | A1 | 9/2004 | Gao |
| 2005/0157883 | A1 | 7/2005 | Herre et al. |
| 2005/0216262 | A1 | 9/2005 | Fejzo |
| 2006/0140412 | A1 | 6/2006 | Villemoes |
| 2006/0165184 | A1 | 7/2006 | Purhagen et al. |
| 2006/0190247 | A1* | 8/2006 | Lindblom ............. G10L 19/008 704/230 |
| 2006/0233379 | A1* | 10/2006 | Villemoes ............. G10L 19/008 381/23 |
| 2007/0019813 | A1 | 1/2007 | Hilpert |
| 2007/0067162 | A1 | 3/2007 | Villemoes et al. |
| 2007/0081597 | A1* | 4/2007 | Disch .................... G10L 19/008 375/242 |
| 2007/0121952 | A1* | 5/2007 | Engdegard ............ G10L 19/008 381/10 |
| 2007/0171944 | A1 | 7/2007 | Schuijers et al. |
| 2007/0172070 | A1 | 7/2007 | Cho |
| 2008/0004883 | A1 | 1/2008 | Vilermo et al. |
| 2009/0083040 | A1* | 3/2009 | Myburg ................ G10L 19/008 704/500 |
| 2009/0125313 | A1 | 5/2009 | Hellmuth |
| 2009/0248424 | A1 | 10/2009 | Koishida et al. |
| 2010/0027819 | A1 | 2/2010 | Van Den Berghe et al. |
| 2010/0142731 | A1* | 6/2010 | Oh ........................ G10L 19/008 381/119 |
| 2010/0153097 | A1 | 6/2010 | Hotho et al. |
| 2010/0332239 | A1 | 12/2010 | Kim et al. |
| 2011/0046964 | A1 | 2/2011 | Moon et al. |
| 2011/0096932 | A1* | 4/2011 | Schuijers .................. H04S 3/02 381/23 |
| 2011/0106540 | A1 | 5/2011 | Schuijers et al. |
| 2011/0182432 | A1 | 7/2011 | Ishikawa et al. |
| 2011/0200198 | A1* | 8/2011 | Grill ....................... G10L 19/18 381/23 |
| 2011/0211702 | A1 | 9/2011 | Mundt |
| 2012/0002818 | A1 | 1/2012 | Heiko et al. |
| 2012/0070007 | A1 | 3/2012 | Kim et al. |
| 2012/0163608 | A1 | 6/2012 | Kishi et al. |
| 2012/0177204 | A1 | 7/2012 | Hellmuth |
| 2012/0275607 | A1 | 11/2012 | Kjoerling et al. |
| 2012/0275609 | A1 | 11/2012 | Beack et al. |
| 2012/0281841 | A1 | 11/2012 | Kim et al. |
| 2012/0314876 | A1 | 12/2012 | Vilkamo |
| 2013/0028426 | A1* | 1/2013 | Purnhagen .......... G10L 19/0212 381/23 |
| 2013/0030819 | A1 | 1/2013 | Purnhagen et al. |
| 2013/0054253 | A1 | 2/2013 | Shirakawa et al. |
| 2013/0121411 | A1 | 5/2013 | Robillard |
| 2013/0124751 | A1 | 5/2013 | Ando et al. |
| 2013/0138446 | A1 | 5/2013 | Hellmuth et al. |
| 2013/0156200 | A1 | 6/2013 | Kishi et al. |
| 2013/0173274 | A1 | 7/2013 | Kuntz et al. |
| 2014/0019146 | A1 | 1/2014 | Neuendorf |
| 2015/0086022 | A1 | 3/2015 | Engdegard et al. |
| 2016/0142845 | A1 | 5/2016 | Dick et al. |
| 2016/0247508 | A1 | 8/2016 | Dick |
| 2017/0134875 | A1 | 5/2017 | Schuijers |

FOREIGN PATENT DOCUMENTS

| | | | |
|---|---|---|---|
| CN | 10 2483921 | | 5/2012 |
| CN | 10 2687405 | | 9/2012 |
| CN | 105556596 | | 5/2016 |
| EP | 2194526 | A1 | 6/2010 |
| EP | 2477188 | | 7/2012 |
| GB | 2485979 | A | 6/2012 |
| JP | 2006-253776 | | 9/2006 |
| JP | 2011-522472 | | 7/2011 |
| JP | 2016531483 | | 10/2016 |
| KR | 1020130069770 | | 6/2013 |
| TW | 200627380 | A | 10/1994 |
| TW | 309691 | | 2/1997 |
| TW | 201007695 | A | 2/2010 |
| WO | 2009141775 | A1 | 11/2009 |
| WO | 2010/125104 | | 11/2010 |
| WO | 2010149700 | | 12/2010 |
| WO | 2011/045409 | | 4/2011 |

OTHER PUBLICATIONS

"Unified Speech and Audio Coding Scheme for High Quality at Low Bitrates" by M. Neuendorf, et al, IEEE ICASSP, p. 1-4, (Year: 2009).*
"Combined Stereo Coding" by Jurgen Herre, et al, AES, the 93rd Convention 1992, Oct. 1-4, San Francisco, USA, p. 1-18 (Year: 1992).*
"MPEG Surround—The ISO/MPEG Standard for Efficient and Compatible Multichannel Audio Coding" by Jurgen Herre et al, J. of AES, vol. 56, No. 11, November, p. 932-955 (Year: 2008) (attached in the prevous office action).*
"Unified Speech and Audio Coding Scheme for High Quality at Low Bitrates" by M. Neuendorf, et al, IEEE ICASSP, p. 1-4, (Year: 2009) (attached in the previous office action).*

(56) References Cited

OTHER PUBLICATIONS

"Combined Stereo Coding" by Jurgen Herre, et al, AES, the 93rd Convention 1992, Oct. 1-4, San Francisco, USA, p. 1-18 (Year: 1992) (attached in the previous office action).*
"MPEG Surround—The ISO/MPEG Standard for Efficient and Compatible Multichannel Audio Coding" by Jurgen Herre et al, J. of AES, vol. 56, No. 11, November, p. 932-955 (attached in the prevous office action) (Year: 2008).*
"Unified Speech and Audio Coding Scheme for High Quality at Low Bitrates" by M. Neuendorf, et al, IEEE ICASSP, p. 1-4, (attached in the previous office action) (Year: 2009).*
"Combined Stereo Coding" by Jurgen Herre, et al, AES, the 93rd Convention 1992, Oct. 1-4, San Francisco, USA, p. 1-18 (attached in the previous office action) (Year: 1992).*
International Search Report and Written Opinion dated Oct. 20, 2014, PCT/EP2014/065416, 10 pages.
Breebaart J. et al., MPEG Spatial Audio Coding / MPEG Surround: Overview and Current Status, Audio Engineering Society Convention Paper, New York, NY, US, Oct. 7, 2005, pp. 1-17 (18 pages).
International Search Report and Written Opinion dated Dec. 10, 2014, PCT/EP2014/064915, 22 pages.
ISO/IEC 23003-3: 2012—Information Technology—MPEG Audio Technologies, Part 3: Unified Speech and Audio Coding (286 pages).
ISO/IEC 13818-7: 2003—Information Technology—Generic coding of moving pictures and associated audio information, Part 7: Advanced audio coding (AAC), (198 pages).
ISO/IEC 23003-2: 2010—Information Technology—MPEG Audio Technologies, Part 2: Spatial Audio Object Coding (SAOC), (134 pages).
ISO/IEC 23003-1: 2007—Information Technology—MPEG Audio Technologies, Part 1: MPEG Surround (288 pages).
Neuendorf Max et al: "MPEG Unified Speech and Audio Coding—The ISO/MPEG Standard for High-Efficiency Audio Coding of All Content Types", AES Convention 132; Apr. 26, 2012, 22 pages.
International Search Report, dated Oct. 6, 2014, PCT/EP2014/065021, 5 pages.
Pontus Carlsson et al., Technical description of CE on Improved Stereo Coding in USAC, 93. MPEG Meeting; Jul. 26, 2010-Jul. 30, 2010; Geneva; (Motion Picture Expert Group or ISO/IEC JTC1/SC29/WG11), No. M17825, Jul. 22, 2010, XP030046415 (22 pages).
Tsingos Nicolas et al.; Surround Sound with Height in Games Using Dolby Pro Logic Ilz, Conference: 41st International Conference: Audio for Games; Feb. 2011, AES, 60 East 42nd Street, Room 2520, New York, NY 10165-2520, USA, Feb. 2, 2011 (10 pages).
Tzagkarakis C. et al., A Multichannel Sinusoidal Model Applied to Spot Microphone Signals for Immersive Audio, IEEE Transactions on Audio, Speech and Language Processing, IEEE Service Center, New York, NY, USA, vol. 17, No. 8, Nov. 1, 2009, pp. 1483-1497, XP011329097, ISSN: 1558-7916, DOI: 10.1109/TASL.2009.2021716, http://dx.doi.org/10.1109/TASL.2009.2021716 (16 pages).
Decision to Grant in parallel Korean Patent Application No. 10-2016-7003911.
ISO/IEC FDIS 23003-3:2011(E), "Information technology—MPEG Audio Technologies—Part 3: Unified Speech and Audio Coding", ISO-IEC JTC 1/SC 29/WG 11, Sep. 20, 2011.
Korean Office Action in parallel Korean Patent Application No. 10-2017-7019086 dated Sep. 25, 2017.
Decision to Grant in parallel Japanese Patent Application No. 2016-528444 mailed Nov. 7, 2017.
JP Office Action mailed Sep. 25, 2018 in parallel JP Application No. 2017-163479.
RU Office Action mailed Oct. 11, 2018 in parallel RU Application No. 2016105647.
Corresponding Chinese Office Action dated Jan. 25, 2019 in CN Application No. 201480041263.5.

* cited by examiner

FLOW DIAGRAM OF DECODER

SCHEMATICS OF HYBRID RESIDUAL DECODER

MULTI-CHANNEL AUDIO DECODER, MULTI-CHANNEL AUDIO ENCODER, METHODS AND COMPUTER PROGRAM USING A RESIDUAL-SIGNAL-BASED ADJUSTMENT OF A CONTRIBUTION OF A DECORRELATED SIGNAL

CROSS-REFERENCE TO RELATED APPLICATIONS

This application is a continuation of U.S. patent application Ser. No. 15/784,332, filed Oct. 16, 2017, which is a divisional of U.S. application Ser. No. 15/167,085, filed May 27, 2016, now U.S. Pat. No. 10,354,661, which is a continuation of U.S. application Ser. No. 15/004,571, filed Jan. 22, 2016, which is a continuation of International Application No. PCT/EP2014/065416, filed Jul. 17, 2014, which are incorporated herein by reference in their entirety, and additionally claims priority from European Applications Nos. EP 13177375.6, filed Jul. 22, 2013, and EP 13189309.1, filed Oct. 18, 2013, which are all incorporated herein by reference in their entirety.

An embodiment according to the invention is related to a multi-channel audio decoder for providing at least two output audio signals on the basis of an encoded representation.

Another embodiment according to the invention is related to a multi-channel audio encoder for providing an encoded representation of a multi-channel audio signal.

Another embodiment according to the invention is related to a method for providing at least two output audio signals on the basis of an encoded representation.

Another embodiment according to the invention is related to a method for providing an encoded representation of a multi-channel audio signal.

Another embodiment according to the present invention is related to a computer program for performing one of the methods.

Generally, some embodiments according to the invention are related to a combined residual and parametric coding.

BACKGROUND OF THE INVENTION

In recent years, demand for storage and transmission of audio content has been steadily increasing. Moreover, the quality requirements for the storage and transmission of audio contents have also been increasing steadily. Accordingly, the concepts for the encoding and decoding of audio content have been enhanced. For example, the so-called "advanced audio coding" (AAC) has been developed, which is described, for example, in the international standard ISO/IEC 13818-7: 2003.

Moreover, some spatial extensions have been created, like, for example, the so-called "MPEG surround" concept, which is described, for example, in the international standard ISO/IEC 23003-1:2007. Moreover additional improvements for the encoding and decoding of a spatial information of audio signals are described in the international standard ISO/IEC 23003-2:2010, which relates to the so-called spatial audio object coding. Moreover, a flexible (switchable) audio encoding/decoding concept, which provides the possibility to encode both general audio signals and speech signals with good coding efficiency and to handle multi-channel audio signals is defined in the international standard ISO/IEC 23003-3:2012, which describes the so-called "unified speech and audio coding" concept.

However, there is a desire to provide an even more advanced concept for an efficient encoding and decoding of multi-channel audio signals.

SUMMARY

An embodiment may have a multi-channel audio decoder for providing at least two output audio signals on the basis of an encoded representation, wherein the multi-channel audio decoder is configured to perform a weighted combination of a downmix signal, a decorrelated signal and a residual signal, to acquire one of the output audio signals, wherein the multi-channel audio decoder is configured to determine a weight describing a contribution of the decorrelated signal in the weighted combination in dependence on the residual signal.

Another embodiment may have a multi-channel audio decoder for providing at least two output audio signals on the basis of an encoded representation, wherein the multi-channel audio decoder is configured to acquire one of the output audio signals on the basis of an encoded representation of a downmix signal, a plurality of encoded spatial parameters and an encoded representation of a residual signal, and wherein the multi-channel audio decoder is configured to blend between a parametric coding and a residual coding in dependence on the residual signal.

According to another embodiment, a method for providing at least two output audio signals on the basis of an encoded representation may have the steps of: performing a weighted combination of a downmix signal, a decorrelated signal and a residual signal, to acquire one of the output audio signals, wherein a weight describing a contribution of the decorrelated signal in the weighted combination is determined in dependence on the residual signal.

According to another embodiment, a method for providing at least two output audio signals on the basis of an encoded representation may have the steps of: acquiring one of the output audio signals on the basis of an encoded representation of a downmix signal, a plurality of encoded spatial parameters and an encoded representation of a residual signal, wherein a blending is performed between a parametric coding and a residual coding in dependence on the residual signal.

Another embodiment may have a non-transitory digital storage medium having a computer program stored thereon to perform the inventive methods when said computer program is run by a computer.

An embodiment according to the invention creates a multi-channel audio decoder for providing at least two output audio signals on the basis of an encoded representation. The multi-channel audio decoder is configured to perform a weighted combination of a downmix signal, a decorrelated signal and a residual signal, to obtain one of the output audio signals. The multi-channel audio decoder is configured to determine a weight describing a contribution of the decorrelated signal in the weighted combination in dependence on the residual signal.

This embodiment according to the invention is based on the finding that output audio signals can be obtained on the basis of an encoded representation in a very efficient way if a weight describing a contribution of the decorrelated signal to the weighted combination of a downmix signal, a decorrelated signal and a residual signal is adjusted in dependence on the residual signal. Accordingly, by adjusting the weight describing the contribution of the decorrelated signal in the weighted combination in dependence on the residual signal, it is possible to blend (or fade) between a parametric coding (or a mainly parametric coding) and a residual coding (or mostly residual coding) without transmitting an additional control information. Moreover it has been found out, that the residual signal, which is included in the encoded representation, is a good indication for the weight describing the contribution of the decorrelated signal in the weighted combination, since it is typically advantageous to put a (comparatively) higher weight on the decorrelated signal if the residual signal is (comparatively) weak (or insufficient for a reconstruction of the desired energy) and to put a (comparatively) smaller weight on the decorrelated signal if the residual signal is (comparatively) strong (or sufficient to reconstruct the desired energy). Accordingly, the concept mentioned above allows for a gradual transition between a parametric coding (wherein, for example, desired energy characteristics and/or correlation characteristics are signaled by parameters and reconstructed by adding a decorrelated signal) and a residual coding (wherein the residual signal is used to reconstruct to output audio signals—in some cases even the waveform of the output audio signals—on the basis of a downmix signal). Accordingly, it is possible to adapt the technique for the reconstruction, and also the quality of the reconstruction, to the decoded signals without having additional signaling overhead.

In an embodiment, the multi-channel audio decoder is configured to determine the weight describing the contribution of the decorrelated signal in the weighted combination (also) in dependence on the decorrelated signal. By determining the weight describing the contribution of the decorrelated signal in the weighted combination both in dependence on the residual signal and the dependence on the decorrelated signal, the weight can be well-adjusted to the signal characteristics, such that a good quality of reconstruction of the at least two output audio signals on the basis of the encoded representation (in particular, on the basis of the downmix signal, the decorrelated signal and the residual signal) can be achieved.

In an embodiment, the multi-channel audio decoder is configured to obtain upmix parameters on the basis of the encoded representation and to determine the weight describing the contribution of the decorrelated signal in the weighted combination in dependence on the upmix parameters. By considering the upmix parameters, it is possible to reconstruct desired characteristics of the output audio signals (like, for example a desired correlation between the output audio signals, and/or desired energy characteristics of the output audio signals) to take a desired value.

In an embodiment, the multi-channel audio decoder is configured to determine the weight describing the contribution of the decorrelated signal in the weighted combination such that the weight of the decorrelated signal decreases with increasing energy of the one or more residual signals. This mechanism allows to adjust the precision of the reconstruction of the at least two output audio signals in dependence on the energy of the residual signal. If the energy of the residual signals is comparatively high, the weight of the contribution of the decorrelated signal is comparatively small, such that the decorrelated signal does no longer detrimentally affect a high quality of the reproduction which is caused by using the residual signal. In contrast, if the energy of the residual signal is comparatively low, or even zero, a high weight is given to the decorrelated signal, such that the decorrelated signal can efficiently bring the characteristics of the output audio signals to desired values.

In an embodiment, the multi-channel audio decoder is configured to determine the weight describing the contribution of the decorrelated signal in the weighted combination such that a maximum weight, which is determined by a decorrelated signal upmix parameter, is associated to the decorrelated signal if an energy of the residual signal is zero, and such that a zero weight is associated to the decorrelated signal if an energy of the residual signal weighted using a residual signal weighting coefficient is larger than or equal to an energy of the decorrelated signal, weighted with the decorrelated signal upmix parameter. This embodiment is based on the finding that the desired energy, which should be added to the downmix signal, is determined by the energy of the decorrelated signal, weighted with the decorrelated signal upmix parameter. Accordingly, it is concluded, that it is no longer necessitated to add the decorrelated signal if the energy of the residual signal, weighted with the residual signal weighting coefficient, is larger than or equal to said energy of the decorrelated signal, weighted with the decorrelated signal upmix parameter. In other words, the decorrelated signal is no longer used for providing the at least two output audio signals if it is judged that the residual signal carries sufficient energy (for example, sufficient in order to reach a sufficient total energy).

In an embodiment, the multi-channel audio decoder is configured to compute a weighted energy value of the decorrelated signal, weighted in dependence on one or more decorrelated signal upmix parameters, and to compute a weighted energy value of the residual signal, weighted using one or more residual signal upmix parameters (which may be equal to the residual signal weighting coefficients mentioned above), to determine a factor in dependence on the weighted energy value of the decorrelated signal and the weighted energy value of the residual signal, and to obtain a weight describing the contribution of the decorrelated signal to (at least) one of the audio output signals on the basis of the factor. It has been found, that this procedure is well suited for an efficient computation of the weight describing the contribution of the decorrelated signal to one or more output audio signals.

In an embodiment, the multi-channel audio decoder is configured to multiply the factor with a decorrelated signal upmix parameter, to obtain the weight describing the contribution of the decorrelated signal to (at least) one of the output audio signals. By using such procedure, it is possible to consider both one or more parameters describing desired signal characteristics of the at least two output audio signals (which is described by the decorrelated signal upmix parameter) and the relationship between the energy of decorrelated signal and the energy of the residual signal, in order to determine the weight describing the contribution of the decorrelated signal in the weighted combination. Thus, there is both the possibility for blending (or fading) between a parametric coding (or predominantly parametric coding) and a residual coding (or a predominantly residual coding) while still considering the desired characteristics of the output audio signals (which are reflected by the decorrelated signal upmix parameter).

In an embodiment, the multi-channel audio decoder is configured to compute the energy of the decorrelated signal, weighted using the decorrelated signal upmix parameters, over a plurality of upmix channels and time slots, to obtain the weighted energy value of the decorrelated signal. Accordingly, it is possible to avoid strong variations of the weighted energy value of the decorrelated signal. Thus, a stable adjustment of the multi-channel audio decoder is achieved.

Similarly, the multi-channel audio decoder is configured to compute the energy of the residual signal, weighted using residual signal upmix parameters, over a plurality of upmix channels and time slots, to obtain the weighted energy value of the residual signal. Accordingly, a stable adjustment of the multi-channel audio decoder is achieved, since strong variations of the weighted energy value of the residual signal are avoided. However, the averaging period may be chosen short enough to allow for a dynamic adjustment of the weighting.

In an embodiment, the multi-channel audio decoder is configured to compute the factor in dependence on a difference between the weighted energy value of the decorrelated signal and the weighted energy value of the residual signal. A computation, which "compares" the weighted energy value of the decorrelated signal and the weighted energy value of the residual signal allows to supplement the residual signal (or the weighted version of the residual signal) using the (weighted version of the) decorrelated signal, wherein the weight describing the contribution of the decorrelated signal is adjusted to the needs for the provision of the at least two audio channel signals.

In an embodiment, the multi-channel audio decoder is configured to compute the factor in dependence on a ratio between a difference between the weighted energy value of the decorrelated signal and the weighted energy value of the residual signal, and the weighted energy value of the decorrelated signal. It has been found, that the computation of the factor in dependence on this ratio brings a long particular good results. Moreover, it should be noted, that the ratio describes which portion of the total energy of the decorrelated signal (weighted using the decorrelated signal upmix parameter) is necessitated in the presence of the residual signal in order to achieve a good hearing impression (or equivalently, to have substantially the same signal energy in the output audio signals when compared to the case in which there is no residual signal).

In an embodiment, the multi-channel audio decoder is configured to determine weights describing contributions of the decorrelated signal to two or more output audio signals. In this case, the multi-channel audio decoder is configured to determine a contribution of the decorrelated signal to a first output audio signal on the basis of the weighted energy value of the decorrelated signal and a first-channel decorrelated signal upmix parameter. Moreover, the multi-channel audio decoder is configured to determine a contribution of the decorrelated signal to a second output audio channel on the basis of the weighted energy value of the decorrelated signal and a second-channel decorrelated signal upmix parameter. Accordingly, two output audio signals can be provided with moderate effort and good audio quality, wherein the differences between the two output audio signals are considered by usage of a first-channel decorrelated signal upmix parameter and a second-channel decorrelated signal upmix parameter.

In an embodiment, the multi-channel audio decoder is configured to disable a contribution of the decorrelated signal to the weighted combination if a residual energy exceeds a decorrelator energy (i.e. an energy of the decorrelated signal, or of a weighted version thereof). Accordingly, it is possible to switch to a pure residual coding, without the usage of the decorrelated signal, if the residual signal carries sufficient energy, if the residual energy exceeds the decorrelator energy.

In an embodiment, the audio decoder is configured to band-wisely determine the weight describing the contribution of the decorrelated signal in the weighted combination in dependence on a band wise determination of a weighted energy value of the residual signal. Accordingly, it is possible to flexibly decide, without an additional signaling overhead, in which frequency bands a refinement of the at least two output audio signals should be based (or should be predominantly based) on a parametric coding, and in which frequency bands the refinement of the at least two output audio signals should based (or should be predominantly based) on a residual coding. Thus, it can be flexibly decided in which frequency bands a wave form reconstruction (or at least a partial wave from reconstruction) should be performed by using (at least predominantly) the residual coding while keeping the weight of the decorrelated signal comparatively small. Thus, it is possible to obtain a good audio quality by selectively applying the parametric coding (which is mainly based on the provision of a decorrelated signal) and the residual coding (which is mainly based on the provision of a residual signal).

In an embodiment, the audio decoder is configured to determine the weight describing the contribution of the decorrelated signal in a weighted combination for each frame of the output audio signals. Accordingly, a fine timing resolution can be obtained, which allows to flexibly switch between a parametric coding (or predominantly parametric coding) and the residual coding (or predominantly residual coding) between subsequent frames. Accordingly, the audio decoding can be adjusted to the characteristics of the audio signal with a good time resolution.

Another embodiment according to the invention creates a multi-channel audio decoder for providing at least two output audio signals on the basis of an encoded representation. The multi-channel audio decoder is configured to obtain (at least) one of the output audio signals on the basis of an encoded representation of a downmix signal, a plurality of encoded spatial parameters and an encoded representation of a residual signal. The multi-channel audio decoder is configured to blend between a parametric coding and the residual coding in dependence on the residual signal. Accordingly, a very flexible audio decoding concept is achieved, wherein the best decoding mode (parametric coding and decoding versus residual coding and decoding) can be selected without additional signaling overhead. Moreover, the above explained consideration is also applied.

An embodiment according to the invention creates a multi-channel audio encoder for providing an encoded representation of a multi-channel audio signal. The multi-channel audio encoder is configured to obtain a downmix signal on the basis of the multi-channel audio signal. Moreover, the multi-channel audio encoder is configured to provide parameters describing dependencies between the channels of the multi-channel audio signal and to provide a residual signal. Moreover, the multi-channel audio encoder is configured to vary an amount of a residual signal included into the encoded representation in the dependence on the multi-channel audio signal. By varying an amount of residual signal included to the encoded representation, it is possible to flexibly adjust the encoding process to the characteristics of the signal. For example, it is possible to include a comparatively large amount of residual signal into the encoded representation for portions (for example, for temporal portions and/or for frequency portions) in which it is desirable to preserve, at least partially, the wave form of the decoded audio signal. Thus, more accurate residual-signal based reconstruction of the multi-channel audio signal is enabled by the possibility to vary the amount of residual signal included into the encoded representation. Moreover, it should be noted that, in combination with the multi-channel audio decoder discussed above, a very efficient concept is created, since the above described multi-channel audio decoder does not even need additional signaling to blend between a (predominantly) parametric coding and a (predominantly) residual coding. Accordingly, the multi-channel encoder discussed here allows to exploit the benefits which are possible by using the above discussed multi-channel audio encoder.

In an embodiment, the multi-channel audio encoder is configured to vary a bandwidth of the residual signal in dependence on the multi-channel audio signal. Accordingly, it is possible to adjust the residual signal, such that the residual signal helps to reconstruct the psycho-acoustically most important frequency bands or frequency ranges.

In an embodiment, the multi-channel audio encoder is configured to select frequency bands for which the residual signal is included into the encoded representation in dependence on the multi-channel audio signal. Accordingly, the multi-channel audio encoder can decide for which frequency bands it is necessitated, or most beneficial, to include a residual signal (wherein the residual signal typically results in at least partial wave form reconstruction). For example, the psycho-acoustically significant frequency bands can be considered. In addition, the presence of transient events may also be considered, since a residual signal typically helps to improve the rendering of transients in an audio decoder. Moreover, the available bitrate can also be taken into a count to decide which amount of residual signal is included into the encoded representation.

In an embodiment, the multi-channel audio encoder is configured to selectively include the residual signal into the encoded representation for frequency bands for which the multi-channel audio signal is tonal while omitting the inclusion of the residual signal into the encoded representation for frequency bands in which the multi-channel audio signal is non-tonal. This embodiment is based on the consideration that an audio quality obtainable at the side of an audio decoder can be improved if tonal frequency bands are reproduced with particularly high quality and using at least partial wave form reconstruction. Accordingly, it is advantageous to selectively include the residual signal into the encoded representation for frequency bands for which the multi-channel audio signal is tonal, since this results in a good compromise between bitrate and audio quality.

In an embodiment, the multi-channel audio encoder is configured to selectively include the residual signal into the encoded representation for time portions and/or frequency band in which the formation of the downmix signal results in a cancellation of signal components of the multi-channel audio signal. It has been found, that it is difficult or even impossible to properly reconstruct multiple audio signals on the basis of a downmix signal if there is a cancellation of components of the multi-channel audio signal, because even a decorrelation or a prediction cannot recover signal components which have been cancelled out when forming the downmix signal. In such a case, the usage of a residual signal is an efficient way to avoid a significant degradation of the reconstructed multi-channel audio signal. Thus, this concept helps to improve the audio quality while avoiding a signaling effort (for example, when taken in combination with the audio decoder described above).

In an embodiment, the multi-channel audio encoder is configured to detect a cancelation of signal components of the multi-channel audio signal in the downmix signal, and the multi-channel audio decoder is also configured to activate the provision of the residual signal in response to a result of the detection. Accordingly, there is an efficient way to avoid a bad audio quality.

In an embodiment, the multi-channel audio encoder is configured to compute the residual signal using a linear combination of at least two channel signals of the multi-channel audio signal and a dependence on upmix coefficients to be used at the side of a multi-channel decoder. Consequently, the residual signal is computed in an efficient manner and well-adapted for a reconstruction of the multi-channel audio signal at the side of a multi-channel audio decoder.

In an embodiment, the multi-channel audio encoder is configured to encode the upmix coefficients using the parameters describing dependencies between the channels of the multi-channel audio signal, or to derive the upmix coefficients from the parameters describing dependencies between the channels of the multi-channel audio signal. Accordingly, the provision of the residual signal can be efficiently performed on the basis of parameters, which are also used for a parametric coding.

In an embodiment, the multi-channel audio encoder is configured to time-variantly determine the amount of residual signal included into the encoded representation using a psychoacoustic model. Accordingly, a comparatively high amount of residual signal can be included for portions (temporal portions, or frequency portions, or time-frequency portions) of the multi-channel audio signal which comprise a comparatively high psychoacoustic relevance, while a (comparatively) smaller amount of residual signal can be included for temporal portions or frequency portions or time-frequency portions of the multi-channel audio signal having a comparatively low psychoacoustic relevance. Accordingly, a good trade of between bitrate and audio quality can be achieved.

In an embodiment, the multi-channel audio encoder is configured to time-variantly determine the amount of residual signal included into the encoded representation in dependency on a currently available bitrate. Accordingly, the audio quality can be adapted to the available bitrate, which allows to achieve the best possible audio quality for the currently available bitrate.

An embodiment according to the invention creates a method for providing at least two output audio signals on the basis of an encoded representation. The method comprises performing a weighted combination of a downmix signal, a decorrelated signal and a residual signal, to obtain one of the output audio signals. A weight describing a contribution of the decorrelated signal in the weighted combination is determined in dependence on the residual signal. This method is based on the same considerations as the audio decoder described above.

Another embodiment according to the invention creates a method for providing at least two output audio signals on the basis of an encoded representation. The method comprises obtaining (at least) one of the output audio signals on the basis of an encoded representation of a downmix signal, a plurality of encoded spatial parameters and an encoded representation of a residual signal. A blending (or fading) is performed between a parametric coding and a residual coding in dependence on the residual signal. This method is also based on the same considerations as the above described audio decoder.

Another embodiment according to the invention creates a method for providing an encoded representation of a multi-channel audio signal. The method comprises obtaining a downmix signal on the basis of the multi-channel audio signal, providing parameters describing dependencies between the channels of the multi-channel audio signal and providing a residual signal. An amount of residual signal included into the encoded representation is varied in dependence on the multi-channel audio signal. This method is based on the same considerations as the above described audio encoder.

Further embodiments, according to the invention create computer programs for performing the methods described herein.

BRIEF DESCRIPTION OF THE DRAWINGS

Embodiments of the present invention will be detailed subsequently referring to the appended drawings, in which.

DETAILED DESCRIPTION

1. Multi-Channel Audio Encoder According to FIG. 1

Figure 1:
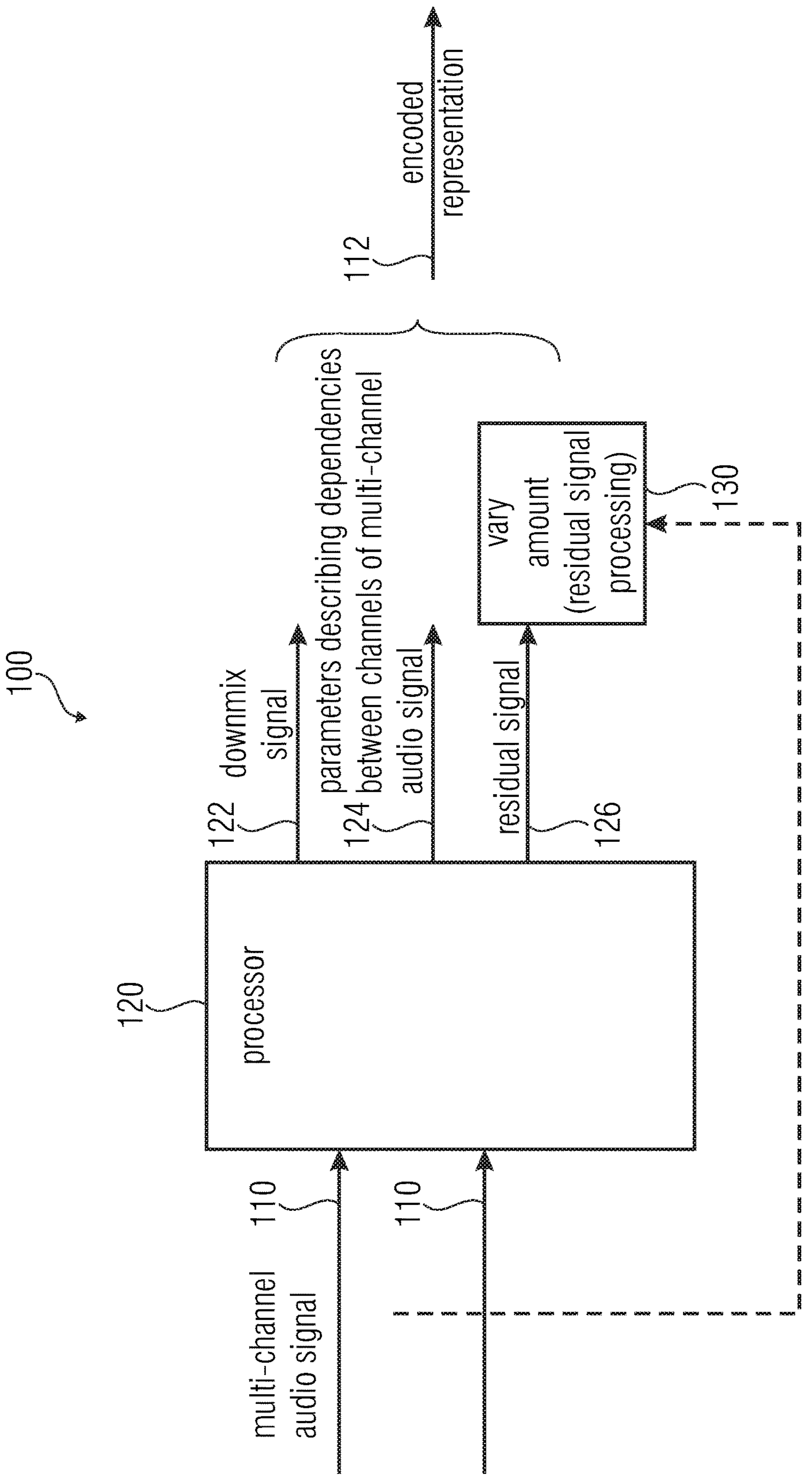
FIG. 1 shows a block schematic diagram of a multi-channel audio encoder, according to an embodiment of the invention.

FIG. 1 shows a block schematic diagram of a multi-channel audio encoder 100 for providing an encoded representation of a multi-channel signal.

The multi-channel audio encoder 100 is configured to receive a multi-channel audio signal 110 and to provide, on the basis theirs, an encoded representation 112 of the multi-channel audio signal 110. The multi-channel audio encoder 100 comprises a processor (or processing device) 120, which is configured to receive the multi-channel audio signal and to obtain a downmix signal 122 on the basis of the multi-channel audio signal 110. The processor 120 is further configured to provide parameters 124 describing dependencies between the channels of the multi-channel audio signal 110. Moreover, the processor 120 is configured to provide a residual signal 126. Furthermore, the multi-channel audio encoder comprises a residual signal processing 130, which is configured to vary an amount of residual signal included into the encoded representation 112 in dependence on the multi-channel audio signal 110.

However, it should be noted, that it is not necessitated that the multi-channel audio decoder comprises a separate processor 120 and a separate residual signal processing 130. Rather, it is sufficient if the multi-channel audio encoder is somehow configured to perform the functionality of the processor 120 and of the residual signal processing 130.

Regarding the functionality of the multi-channel audio encoder 100, it can be noted that the channel signals of the multi-channel audio signal 110 are typically encoded using a multi-channel encoding, wherein the encoded representation 112 typically comprises (in an encoded form) the downmix signal 122, the parameters 124 describing dependencies between channels (or channel signals) of the multi-channel audio signal 110 and the residual signal 126. The downmix signal 122 may, for example, be based on a combination (for example, linear combination) of the channel signals of the multi-channel audio signal. However a signal downmix signal 122 may provided on the basis of a plurality of channel signals of the multi-channel audio signal. However, alternatively, two or more downmix signal may be associated with a larger number (typically larger than the number of downmix signals) of channel signals of the multi-channel audio signal 110. The parameters 124 may describe dependencies (for example, a correlation, a covariance, a level relationship or the like) between channels (or channel signals) of the multi-channel audio signal 110. Accordingly, the parameters 124 serve the purpose to derive a reconstructed version of the channel signals of the multi-channel audio signal 110 on the basis of the downmix signal 122 at the side of an audio decoder. For this purpose, the parameters 124 describe desired characteristics (for example, individual characteristics or relative characteristics) of the channel signals of the multi-channel audio signal, such that an audio encoder, which uses a parametric decoding, can reconstruct channel signals on the basis of the one or more downmix signals 122.

In addition, the multi-channel audio decoder 100 provides the residual signal 126, which typically represents signal components that, according to the expectation or estimation of the multi-channel audio encoder, cannot be reconstructed by an audio decoder (for example, by an audio decoder following a certain processing rule) on the basis of the downmix signal 122 and the parameters 124. Accordingly, the residual signal 126 can typically be considered as a refinement signal, which allows for a wave from reconstruction, or at least for a partial wave from reconstruction, at the side of an audio decoder.

However, the multi-channel audio encoder 100 is configured to vary an amount of residual signal included into the encoded representation 112 in dependence on the multi-channel audio signal 110. In other words, the multi-channel audio encoder may, for example, decide about the intensity (or the energy) of the residual signal 126 which is included into the encoded representation 112. Additionally or alternatively, the multi-channel audio encoder 100 may decide, for which frequency bands and/or for how many frequency bands the residual signal is included into the encoded representation 112. By varying the "amount" of residual signal 126 included into the encoded representation 112 in dependence on the multi-channel audio signal (and/or in dependence on an available bitrate), the multi-channel audio encoder 100 can flexibly determine with which accuracy the channel signals of the multi-channel audio signal 110 can be reconstructed at the side of an audio decoder on the basis of the encoded representation 112. Thus, the accuracy with which the channel signals of the multi-channel audio signal 110 can be reconstructed, can be adapted to a psychoacoustic relevance of different signal portions of the channel signals of the multi-channel audio signal 110 (like, for example, temporal portions, frequency portions and/or time/frequency portions). Thus, signal portions of high psychoacoustic relevance (like, for example, tonal signal portions or signal portions comprising transient events can be encoded with particularly high resolution by including a “large amount” of the residual signal 126 into the encoded representation. For example, it can be achieved that a residual signal with a comparatively high energy is included in the encoded representation 112 for signal portions of high psychoacoustic relevance. Moreover, it can be achieved that a residual signal of high energy is included in the encoded representation 112 if the downmix signal 122 comprises a “poor quality”, for example, if there is a substantial cancellation of signal components when combining the channel signals of the multi-channel audio signal 112 into the downmix signal 122. In other words, the multi-channel audio decoder 100 can selectively embed a “larger amount” of residual signal (for example, a residual signal having a comparatively high energy) into the encoded representation 112 for signal portions of the multi-channel audio signal 110 for which the provision of a comparatively large amount of the residual signal brings along a significant improvement of the reconstructed channel signals (reconstructed at the side of an audio decoder).

Accordingly, the variation of the amount of residual signal included in the encoded representation in dependence on the multi-channel audio signal 110 allows to adapt the encoded representation 112 (for example, the residual signal 126, which is included into the encoded representation in an encoded form) of the multi-channel audio signal 110, such that a good trade off between bitrate efficiency and audio quality of the reconstructed multi-channel audio signal (reconstructed at the side of an audio decoder) can be achieved.

It should be noted, that the multi-channel audio encoder 100 can be optionally improved in many different ways. For example the multi-channel audio encoder may be configured to vary a bandwidth of the residual signal 126 (which is included into the encoded representation) in dependence on the multi-channel audio signal 110. Accordingly, the amount of residual signal included into the encoded representation 112 may be adapted to perceptually most important frequency bands.

Optionally, the multi-channel audio decoder may be configured to select frequency bands for which the residual signal 126 is included into the encoded representation 112 in dependence on the multi-channel audio signal 110. Accordingly, the encoded representation 120 (more precisely, the amount of residual signal included into the encoded representation 112) may be adapted to the multi-channel audio signal, for example, to the perceptually most important frequency bands of the multi-channel audio signal 110.

Optionally, the multi-channel audio encoder may be configured to including the residual signal 126 into the encoded representation for frequency bands for which the multi-channel audio signal is tonal. In addition, the multi-channel audio encoder may be configured to not include the residual signal 126 into the encoded representation 112 for frequency bands in which the multi-channel audio signal is non-tonal (unless any other specific condition is fulfilled which causes an inclusion of the residual signal into the encoded representation for a specific frequency band). Thus, the residual signal may be selectively included into the encoded representation for perceptually important tonal frequency bands.

Optionally, the multi-channel audio encoder 100 may be configured to selectively include the residual signal into the encoded representation for time portions and/or for frequency bands in which the formation of the downmix signal results in a cancellation of signal components of the multi-channel audio signal. For example, the multi-channel audio encoder may be configured to detect a cancellation of signal components of the multi-channel audio signal 110 in the downmix signal 122, and to activate the provision of the residual signal 126 (for example, the inclusion of the residual signal 126 into the encoded representation 112) in response to the result of the detection. Accordingly, if the downmixing (or any other typically linear combination) of channel signals of the multi-channel audio signal 110 into the downmix signal 122 results in a cancellation of signal components of the multi-channel audio signal 112 (which may be caused, for example, by signal components of different channel signals which are phase-shifted by 180 degrees), the residual signal 126, which helps to overcome the detrimental effect of this cancellation when reconstructing the multi-channel audio signal 110 in an audio decoder, will be included into the encoded representation 112. For example, the residual signal 126 may be selectively included in the encoded representation 112 for frequency bands for which there is such a cancellation.

Optionally, the multi-channel audio encoder may be configured to compute the residual signal using a linear combination of at least two channel signals of the multi-channel audio signal and in dependence on upmix coefficients to be used at the side of a multi-channel audio decoder. Such a computation of a residual signal is efficient and allows for a simple reconstruction of the channel signals at the side of an audio decoder.

Optionally, the multi-channel audio encoder may be configured to encode the upmix coefficients using the parameter 124 describing dependencies between the channels of the multi-channel audio signal, or to derive the upmix coefficients from the parameters describing dependencies between the channels of the multi-channel audio signal. Accordingly, the parameters 124 (which may, for example, be intra-channel level difference parameters, intra-channel correlation parameters, or the like) may be used both for the parametric coding (encoding or decoding) and for the residual signal-assisted coding (encoding or decoding). Thus, the usage of the residual signal 126 does not bring along an additional signaling overhead. Rather, the parameters 124, which are used for the parametric coding (encoding/decoding) anyway, are re-used also for the residual coding (encoding/decoding). Thus high coding efficiency can be achieved.

Optionally, the multi-channel audio decoder may be configured to time-variantly determine the amount of residual signal included into the encoded representation using a psychoacoustic model. Accordingly, the encoding precision can be adapted to psychoacoustic characteristics of the signal, which typically results in a good bitrate efficiency.

However, it should be noted, that the multi-channel audio encoder can optionally be supplemented by any of the features or functionalities described herein (both in the description and in the claims). Moreover, the multi-channel audio encoder can also be adapted in parallel with the audio decoder described herein, to cooperate with the audio decoder.

2. Multi-Channel Audio Decoder According to FIG. 2

Figure 2:
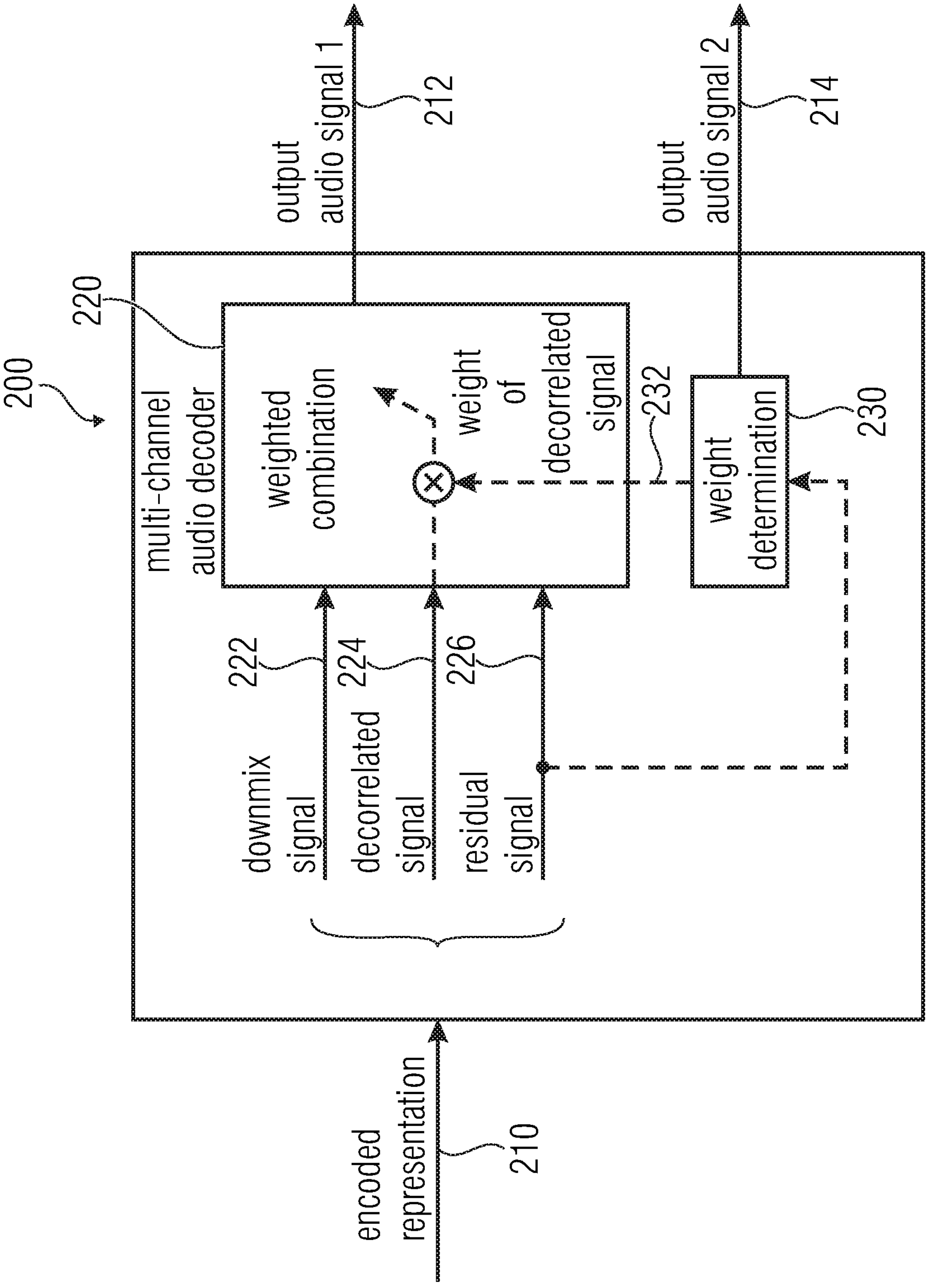
FIG. 2 shows a block schematic diagram of a multi-channel audio decoder, according to an embodiment of the invention.

FIG. 2 shows a block schematic diagram of a multi-channel audio decoder 200 according to an embodiment of the present invention.

The multi-channel audio decoder 200 is configured to receive an encoded representation 210 and to provide, on the basis thereof, at least two output audio signals 212, 214. The multi-channel audio decoder 200 may, for example, comprise a weighting combiner 220, which is configured to perform a weighted combination of a downmix signal 222, a decorrelated signal 224 and a residual signal 226, to obtain (at least) one of the output signals, for example, the first output audio signal 212. It should be noted here, that the downmix signal 212, the decorrelated signal 224 and the residual signal 226 may, for example, be derived from the encoded representation 210, wherein the encoded representation 210 may carry an encoded representation of the downmix signal 220 and an encoded representation of the residual signal 226. Moreover, the decorrelated signal 224 may, for example, be derived from the downmix signal 222 or may be derived using additional information included in the encoded representation 210. However, the decorrelated signal may also be provided without any dedicated information from the encoded representation 210.

The multi-channel audio decoder 200 is also configured to determine a weight describing a contribution of the decorrelated signal 224 in the weighted combination in dependence on the residual signal 226. For example, the multi-channel audio decoder 200 may comprise a weight determinator 230, which is configured to determine a weight 232 describing the contribution of the decorrelated signal 224 in the weighted combination (for example, the contribution of the decorrelated signal 224 to the first output audio signal 212) on the basis of the residual signal 226.

Regarding the functionality of the multi-channel audio decoder 200, it should be noted, that the contribution of the decorrelated signal 224 to the weighted combination, and consequently to the first output audio signal 212, is adjusted in a flexible (for example, temporally variable and frequency-dependent) manner in dependence on the residual signal 226, without additional signaling overhead. Accordingly, the amount of decorrelated signal 224, which is included into the first output audio signal 212, is adapted in dependence on the amount of residual signal 226 which is included into the first output audio signal 212, such that a good quality of the first output audio signal 212 is achieved. Accordingly, it is possible to obtain an appropriate weighting of the decorrelated signal 224 under any circumstances and without an additional signaling overhead. Thus, using the multi-channel audio decoder 200, a good quality of the decoded output audio signal 212 can be achieved with moderate bitrate. A precision of the reconstruction can be flexibly adjusted by an audio encoder, wherein the audio encoder can determine an amount of residual signal 226 which is included in the encoded representation 212 (for example, how big the energy of the residual signal 226 included in the encoded representation 210 is, or to how many frequency bands the residual signal 226 included in the encoded representation 210 relates), and the multi-channel audio decoder 200 can react accordingly and adjust the weighting of the decorrelated signal 224 to fit the amount of residual signal 226 included in the encoded representation 210. Consequently, if there is a large amount of residual signal 226 included in the encoded representation 210 (for example, for a specific frequency band, or for specific temporal portion), the weighted combination 220 may predominantly (or exclusively) consider the residual signal 226 while giving little weight (or no weight) to the decorrelated signal 224. In contrast, if there is only a smaller amount of a residual signal 226 included in the encoded representation 210, the weighted combination 220 may predominantly (or exclusively) consider the decorrelated signal 224 but only to a comparatively small degree (or not at all) the residual signal 226 in addition to the downmix signal 222. Thus, the multi-channel audio decoder 200 can flexible cooperate with an appropriate multi-channel audio encoder and adjust the weighted combination 220 to achieve the best possible audio quality under any circumstances (irrespective of whether a smaller amount or a larger amount of residual signal 226 is included in the encoded representation 210).

It should be noted, that the second output audio signal 214 may be generated in a similar manner. However, it is not necessitated to apply the same mechanisms to the second output audio signal 214, for example, if there are different quality requirements with respect to the second output audio signal.

In an optional improvement, the multi-channel audio decoder may be configured to determine the weight 232 describing the contribution of the decorrelated signal 224 in the weighted combination in dependence on the decorrelated signal 224. In other words, the weight 232 may be dependent both on the residual signal 226 and the decorrelated signal 224. Accordingly, the weight 232 may be even better adapted to a currently decoded audio signal without additional signaling overhead.

As another optional improvement, the multi-channel audio decoder may be configured to obtain upmix parameters on the basis of the encoded representation 212 and to determine the weight 232 describing the contribution of the decorrelated signal in the weighted combination in dependence on the upmix parameters. Accordingly, the weight 232 may be additionally dependent on the upmix parameters, such that an even better adaptation of the weight 232 can be achieved.

As another optional improvement, the multi-channel audio decoder may be configured to determine the weight describing the contribution of the decorrelated signal in the weighted combination such that the weight of the decorrelated signal decreases with increasing energy of the residual signal. Accordingly, a blending or fading can be performed between a decoding which is predominantly based on the decorrelated signal 224 (in addition to a downmix signal 222) and a decoding which is predominantly based on the residual signal 226 (in addition to a downmix signal 222).

As another optional improvement, the multi-channel audio decoder 200 may be configured to determine the weight 232 such that a maximum weight, which is determined by a decorrelated signal upmix parameter (which may be included in, or derived from, the encoded representation 210) is associated to the decorrelated signal 224 if an energy of the residual signal 226 is zero, and that such that a zero weight is associated to the decorrelated signal 224 if an energy of the residual signal 226, weighted with the residual signal weighting coefficient (or a residual signal upmix parameter), is larger than or equal to an energy of the decorrelated signal 224, weighted with the decorrelated signal upmix parameter. Accordingly, it is possible to completely blend (or fade) between a decoding based on the decorrelated signal 224 and a decoding based on the residual signal 226. If the residual signal 226 is judged to be strong enough (for example, when the energy of the weighted residual signal is equal to or larger than the energy of the weighted decorrelated signal 224), the weighted combination may fully rely on the residual signal 226 to refine the downmix signal 222 while leaving the decorrelated signal 224 out of consideration. In this case, a particularly good (at least partial) wave form reconstruction at the side of the multi-channel audio decoder 200 can be performed, since the consideration of the decorrelated signal 224 typically prevents a particularly good wave form reconstruction while the usage of the residual signal 226 typically allows for a good wave form reconstruction.

In another optional improvement, the multi-channel audio decoder 200 may be configured to compute a weighted energy value of a decorrelated signal, weighted in dependence on one or more decorrelated signal upmix parameters, and to compute a weighted energy value of the residual signal, weighted using one or more residual signal upmix parameters. In this case, the multi-channel audio decoder may be configured to determine a factor in dependence on the weighted energy value of the decorrelated signal and the weighted energy value of the residual signal and to obtain a weight describing the contribution of the decorrelated signal 224 to one of the output audio signals (for example, the first output audio signal 212) on the basis of the factor. Thus, the weight determination 230 may provide particularly well-adapted weighting values 232.

In an optional improvement, the multi-channel audio decoder 200 (or the weight determinator 230 thereof) may be configured to multiply the factor with the decorrelated signal upmix parameter (which may be included in the encoded representation 210, or derived from the encoded representation 210), to obtain the weight (or weighting value) 232 describing the contribution of the decorrelated signal 224 to one of the output audio signals (for example the first output audio signal 212).

In an optional improvement, the multi-channel audio decoder (or the weight determinator 230 thereof) may be configured to compute the energy of the decorrelated signal 224, weighted using decorrelated signal upmix parameters (which may be included in the encoded representation 210, or which may be derived from the encoded representation 210), over a plurality of upmix channels and time slots, to obtain the weighted energy value of the decorrelated signal.

As a further optional improvement, the multi-channel audio decoder 200 may be configured to compute the energy of the residual signal 224, weighted using residual signal upmix parameters (which may be included in the encoded representation 210 or which may be derived from the encoded representation 210) over a plurality of upmix channels and time slots, to obtain the weighted energy value of the residual signal.

As another optional improvement, the multi-channel audio decoder 200 (or the weight determinator 232 thereof) may be configured to compute the factor mentioned above in dependence on a difference between the weighted energy value of the decorrelated signal and the weighted energy value of the residual signal. It has been found, that such computation is an efficient solution to determine the weighting values 232.

As an optional improvement, the multi-channel audio decoder may be configured to compute the factor in dependence on a ratio between a difference between the weighted energy value of the decorrelated signal 224 and the weighted energy value of the residual signal 226, and the weighted energy value of the decorrelated signal 224. It has been found, that such a computation for the factor brings along good results for blending between a predominantly decorrelation signal based refinement of the downmix signal 222 and a predominantly residual signal based refinement of the downmix signal 222.

As an optional improvement, the multi-channel audio decoder 200 may be configured to determine weights describing contributions of the decorrelated signals to two or more output audio signals, like, for example, the first output audio signal 212 and the second output audio signal 214. In this case, the multi-channel audio decoder may be configured to determine a contribution of the decorrelated signal 224 to the first output audio signal 212 on the basis of the weighted energy value of the decorrelated signal 224 and a first-channel decorrelated signal upmix parameter. Moreover, the multi-channel audio decoder may be configured to determine a contribution of the decorrelated signal 224 to the second output audio signal 214 on the basis of the weighted energy value of the decorrelated signal 224 and a second-channel decorrelated signal upmix parameter. In other words, different decorrelated signal upmix parameters may be used for providing the first output audio signal 212 and the second output audio signal 214. However, the same weighted energy value of the decorrelated signal may be used for determining the contribution of the decorrelated signal to the first output audio signal 212 and the contribution of the decorrelated signal to the second output audio signal 214. Thus, an efficient adjustment is possible, wherein nevertheless different characteristics of the two output audio signals 212, 214 can be considered by different decorrelated signal upmix parameters.

As an optional improvement, the multi-channel audio decoder 200 may be configured to disable a contribution of the decorrelated signal 224 to the weighted combination if a residual energy (for example, an energy of the residual signal 226 or of a weighted version of the residual signal 226) exceeds a decorrelated energy (for example, an energy of the decorrelated signal 224 or of a weighted version of the decorrelated signal 224).

As a further optional improvement, the audio decoder may be configured to band-wisely determine the weight 232 describing a contribution of the decorrelated signal 224 in the weighted combination in dependence on a band-wise determination of a weighted energy value of the residual signal. Accordingly a fine-tuned adjustment of the multi-channel audio decoder 200 to the signals to be decoded can be performed.

In another optional improvement, the audio decoder may be configured to determine the weight describing a contribution of the decorrelated signal in the weighted combination for each frame of the output audio signal 212, 214. Accordingly, a good temporal resolution can be achieved.

In a further optional improvement, the determination of the weighting value 232 may be performed in accordance with some of the equations provided below.

Moreover, it should be noted, that the multi-channel audio decoder 200 can be supplemented by any of the features or functionalities described herein, also with respect to other embodiments.

3. Multi-Channel Audio Decoder According to FIG. 3

Figure 3:
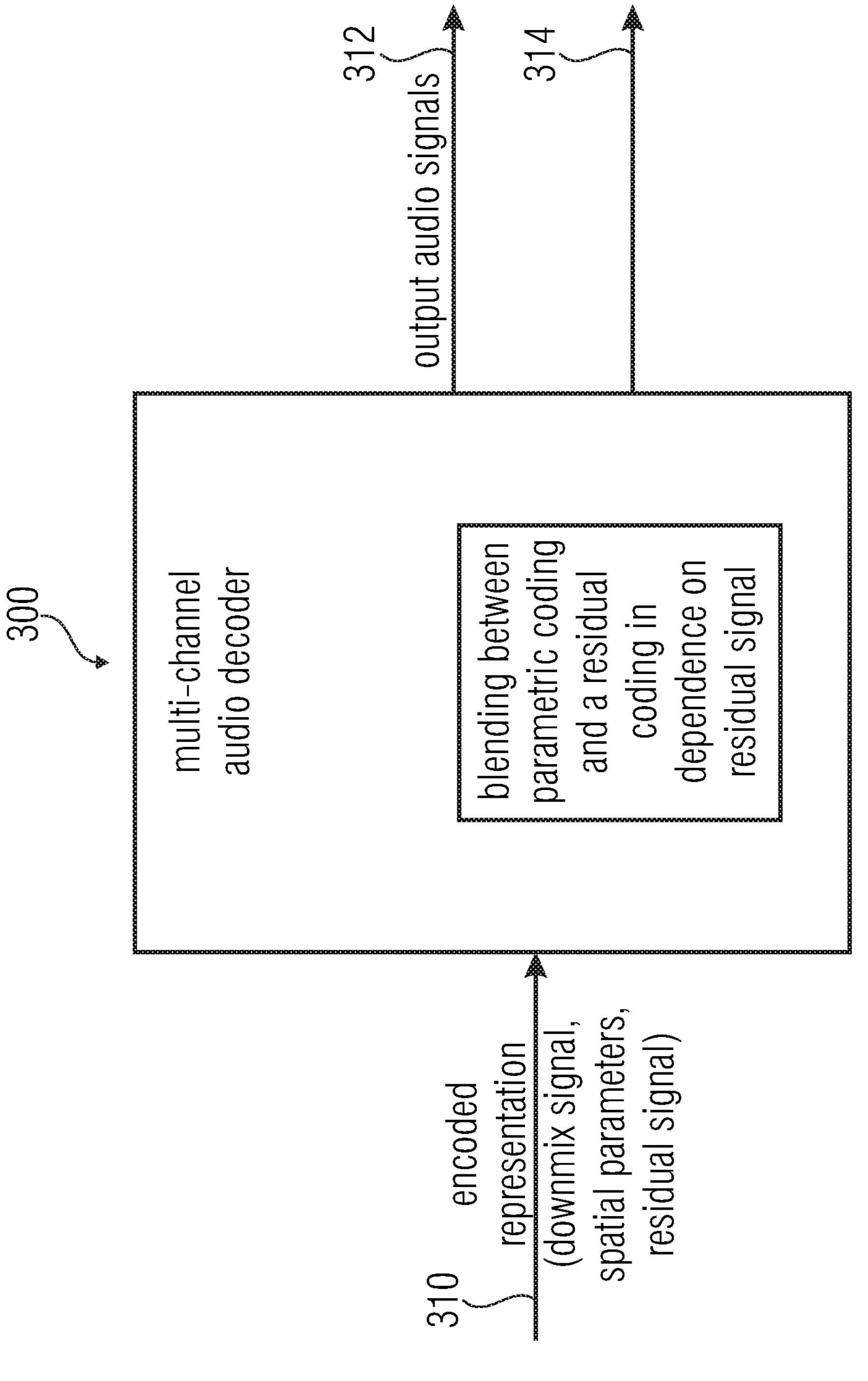
FIG. 3 shows a block schematic diagram of a multi-channel audio decoder, according to a another embodiment of the present invention.

FIG. 3 shows a block schematic diagram of a multi-channel audio decoder 300 according to an embodiment of the invention. The multi-channel audio decoder 300 is configured to receive an encoded representation 310 and to provide, on the basis thereof, two or more output audio signals 312, 314. The encoded representation 310 may, for example, comprise an encoded representation of a downmix signal, an encoded representation of one or more spatial parameters and an encoded representation of a residual signal. The multi-channel audio decoder 300 is configured to obtain (at least) one of the output audio signals, for example, a first output audio signal 312 and/or a second output audio signal 314, on the basis of the encoded representation of the downmix signal, a plurality of encoded spatial parameters and an encoded representation of the residual signal.

In particular, the multi-channel audio decoder 300 is configured to blend between a parametric coding and a residual coding in dependence on the residual signal (which is included, in an encoded form, in the encoded representation 310). In other words, the multi-channel audio decoder 300 may blend between a decoding mode in which the provision of the output audio signals 312, 314 is performed on the basis of the downmix signal and using spatial parameters which describe a desired relationship between the output audio signals 312, 314 (for example, a desired inter-channel level difference or a desired inter-channel correlation of the output audio signals 312, 314), and a decoding mode in which the output audio signals 312, 314 are reconstructed on the basis of the downmix signal using the residual signal. Thus, the intensity (for example, energy) of the residual signal, which is included in the encoded representation 310, may determine whether the decoding is mostly (or exclusively) based on the spatial parameters (in addition to the downmix signal) or whether the decoding is mostly (or exclusively) based on the residual signal (in addition to the downmix signal), or whether an intermediate state is taken in which both the spatial parameters and the residual signal affect the refinement of the downmix signal, to derive the output audio signals 312, 314 from the downmix signal.

Moreover, the multi-channel audio decoder 300 allows for a decoding which is well-adapted to the current audio content without high signaling overhead by blending between the parametric coding, (in which, typically, a comparatively high weight is given to a decorrelated signal when providing the output audio signals 312, 314) and a residual coding (in which, typically, a comparatively small weight is given to a decorrelated signal) in dependence on the residual signal.

Moreover, it should be noted, that the multi-channel audio decoder 300 is based on similar considerations as the multi-channel audio decoder 200 and that optional improvements described above with respect to the multi-channel audio decoder 200 can also be applied to the multi-channel audio decoder 300.

4. Method for Providing an Encoded Representation of a Multi-Channel Audio Signal According to FIG. 4

Figure 4:
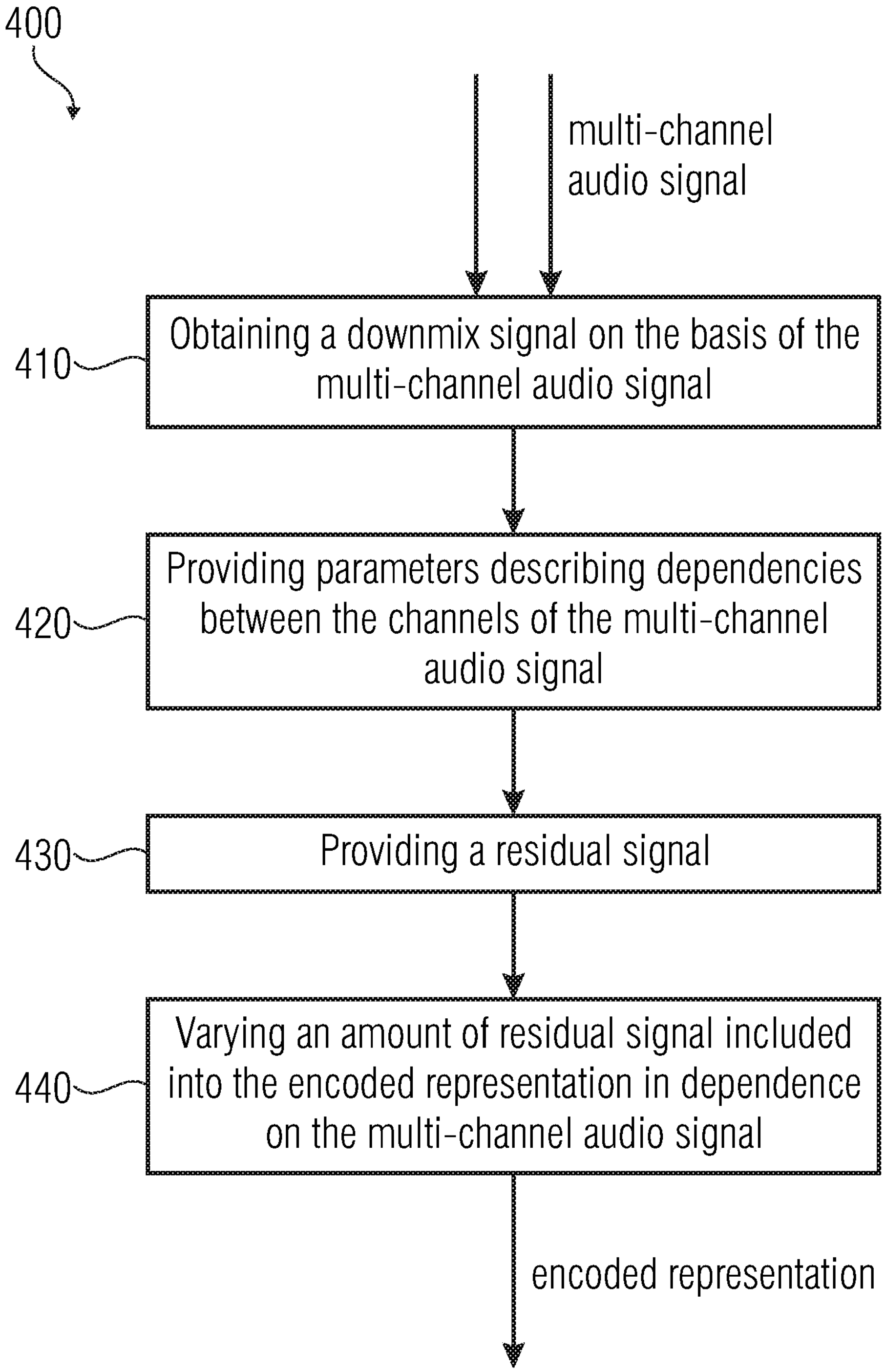
FIG. 4 shows a flow chart of a method for providing an encoded representation of a multi-channel audio signal, according to an embodiment of the invention.

FIG. 4 shows a flow chart of a method 400 for providing an encoded representation of a multi-channel audio signal.

The method 400 comprises a step 410 of obtaining a downmix signal on the basis of a multi-channel audio signal. The method 400 also comprises a step 420 of providing parameters describing dependencies between the channels of the multi-channel audio signal. For example, inter-channel-level-difference parameters and/or inter-channel correlation parameters (or covariance parameters) may be provided, which describe dependencies between channels of the multi-channel audio signal. The method 400 also comprises a step 430 of providing a residual signal. Moreover, the method comprises a step 440 of a varying an amount of residual signal included into the encoded representation in dependence on the multi-channel audio signal.

It should be noted, that the method 400 is based on the same considerations as the audio encoder 100 according to FIG. 1. Moreover, the method 400 can be supplemented by any of the features and functionalities described herein with respect to the inventive apparatuses.

5. Method for Providing at Least Two Output Audio Signals on the Basis of an Encoded Representation According to FIG. 5

Figure 5:
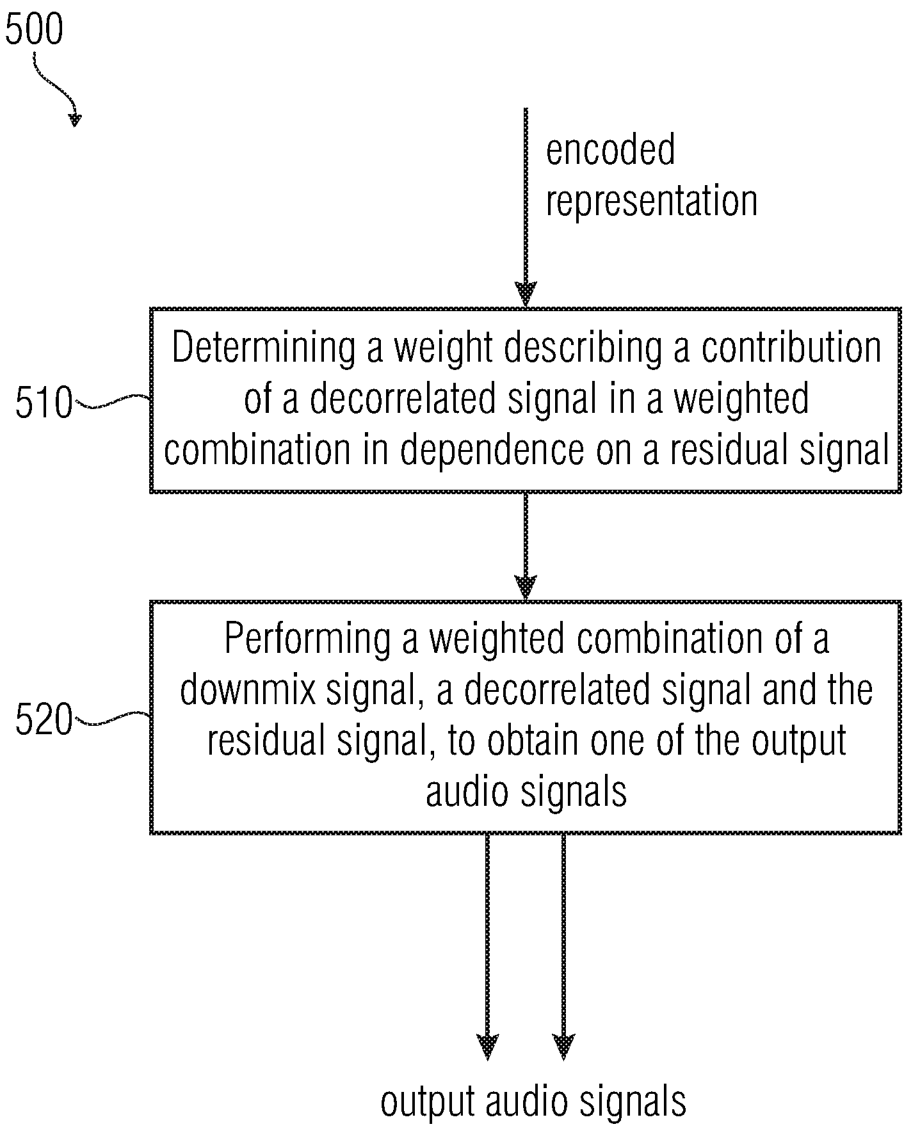
FIG. 5 shows a flow chart of a method for providing at least two output audio signals on the basis of an encoded representation, according to an embodiment of the invention.

FIG. 5 shows a flow chart of a method 500 for providing at least two output audio signals on the basis of an encoded representation. The method 500 comprises determining 510 a weight describing a contribution of a decorrelated signal in a weighted combination in dependence on a residual signal. The method 500 also comprises performing 520 a weighted combination of a downmix signal, a decorrelated signal and a residual signal, to obtain one of the output audio signals.

It should be noted, that the method 500 can be supplemented by any of the features and functionalities described herein with respect to the inventive apparatuses.

6. Method for Providing at Least Two Output Audio Signals on the Basis of an Encoded Representation According to FIG. 6

Figure 6:
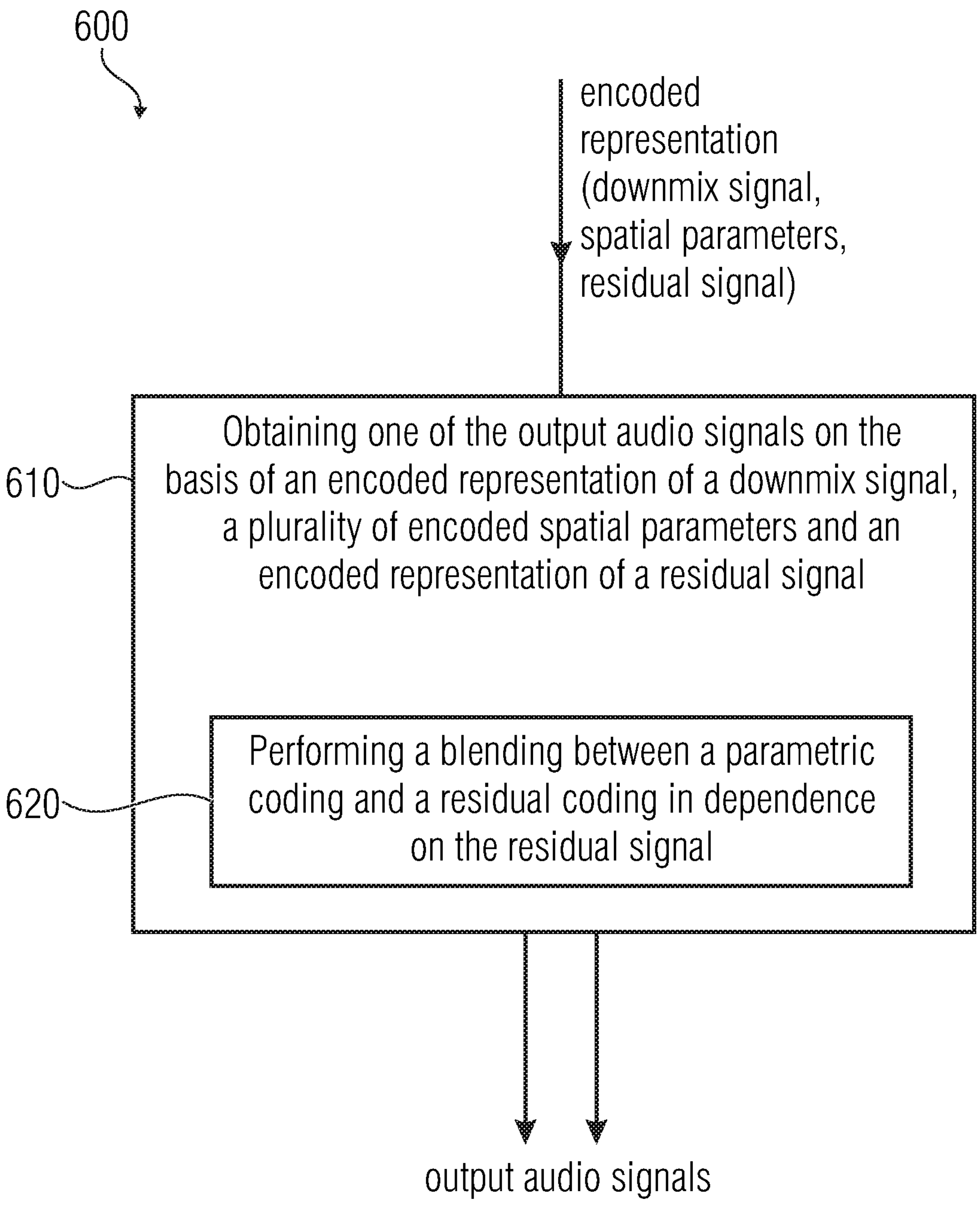
FIG. 6 shows a flow chart of a method for providing at least two output audio signals on the basis of an encoded representation, according to another embodiment of the invention.

FIG. 6 shows a flow chart of a method 600 for providing at least two output audio signals on the basis of an encoded representation. The method 600 comprises obtaining 610 one of the output audio signals on the basis of an encoded representation of a downmix signal, a plurality of encoded spatial parameters and an encoded representation of a residual signal. Obtaining 610 one of the output audio signals comprises performing 620 a blending between a parametric coding and a residual coding in dependence on the residual signal.

It should be noted, that the method 600 can be supplemented by any of the features and functionalities described herein with respect to the inventive apparatuses.

7. Further Embodiments

In the following, some general considerations and some further embodiments will be described.

7.1 General Considerations

Embodiments according to the invention are based on the idea that, instead of using a fixed residual bandwidth, a decoder (for example, a multi-channel audio decoder) detects the amount of transmitted residual signal by measuring its energy band-wise for each frame (or, generally, at least for a plurality of frequency ranges and/or for a plurality of temporal portions). Depending on the transmitted spatial parameters, a decorrelated output is added where residual energy "is missing", to achieve a necessitated (or desired) amount of output energy and decorrelation. This allows a variable residual bandwidth as well as band pass-style residual signals. For example, it is possible to only use residual coding for tonal bands. To be able to use the simplified downmix for parametric coding as well as for wave form-preserving coding (which is also designated as residual coding), a residual signal for the simplified downmix is defined herein.

7.2 Calculation of the Residual Signal for the Simplified Downmix

In the following, some considerations regarding the calculation of the residual signal and regarding the construction of channel signals of a multi-channel audio signal will be described.

In unified-speech- and audio-coding (USAC), there is no residual signal defined when a so-called "simplified downmix" is used. Thus, no partially waveform preserving coding is possible. However, in the following, a method for a calculating a residual signal for the so-called "simplified downmix" will be described.

"Simplified downmix" weights $d_1$, $d_2$ are calculated per scale factor band, whereas parametric upmix coefficients $u_{d1}$, $u_{d2}$ are calculated per parameter band. Thus, coefficients $w_{r1}$, $w_{r2}$, for calculating the residual signal cannot be directly computed from the spatial parameters (as it is the case for a classic MPEG surround), but may need to be determined scale factor band-wise from the down- and upmix coefficients.

With L, R being the input channels and D being the downmix channel, a residual signal res should fulfill the following properties:

$$D=d_1L+d_2R \tag{1}$$

$$L=u_{d,1}D+u_{r,1}res \tag{2}$$

$$R=u_{d,2}D+u_{r,2}res \tag{3}$$

This is achieved by calculating the residual as $$res=w_{r,1}L+w_{r,2}R \tag{4}$$

using the downmix weights $$w_{r,1}=\frac{1}{2}\left(\frac{1-u_{d,1}d_1}{u_{r,1}}-\frac{u_{d,2}d_1}{u_{r,2}}\right) \tag{5}$$

$$w_{r,2}=\frac{1}{2}\left(\frac{1-u_{d,2}d_2}{u_{r,2}}-\frac{u_{d,1}d_2}{u_{r,1}}\right). \tag{6}$$

The residual upmix coefficients $u_{r,1}$, $u_{1,2}$ used by the decoder are chosen in a way to ensure robust decoding. Since the simplified downmix has asymmetric properties (as opposed to MPEG Surround with fixed weights) an upmix depending on the spatial parameters is applied, e.g. using the following upmix coefficients:

$$u_{r,1}=\max\{u_{d,1},0.5\} \tag{7}$$

$$u_{r,2}=\max\{u_{d,2},0.5\} \tag{8}$$

Another option is to define the residual upmix coefficients to be orthogonal to the downmix signal's upmix coefficients, so that:

$$\left\langle\begin{pmatrix}u_{d,1}\\u_{d,2}\end{pmatrix},\begin{pmatrix}u_{r,1}\\u_{r,2}\end{pmatrix}\right\rangle\overset{!}{=}0 \tag{9}$$

In other words, an audio decoder may obtain the downmix signal D using a linear combination of a left channel signal L (first channel signal) and a right channel signal R (second channel signal). Similarly, the residual signal res is obtained using a linear combination of the left channel L and the right channel signal R (or, generally, of a first channel signal and a second channel signal of the multi-channel audio signal).

It can be seen, for example, in Equations (5) and (6), the downmix weights $w_{r,1}$ and $w_{r,2}$ for obtaining the residual signal res can be obtained when the simplified downmix weights $d_1$, $d_2$, the parametric upmix coefficients $u_{d,1}$ and $u_{d,2}$ and the residual upmix coefficients $u_{r,1}$ and $u_{r,2}$ are determined. Moreover it can be seen, that $u_{r,1}$ and $u_{r,2}$ can be derived from $u_{d,1}$ and $u_{d,2}$ using equations (7) and (8) or equation (9). The simplified downmix weights $d_1$ and $d_2$, as well as the parametric upmix coefficients $u_{d,1}$ and $u_{d,2}$ can be obtained in the usual manner.

7.3 Encoding Process

In the following, some details regarding the encoding process will be described. The encoding may, for example, be performed by the multi-channel audio encoder 100 or by any other appropriate means or computer programs.

The amount of a residual that is transmitted is determined by a psychoacoustic model of the encoder (for example, multi-channel audio encoder), depending on the audio signal (for example, depending on the channel signals of the multi-channel audio signal 110) and an available bitrate. The transmitted residual signal can, for example, be used for partial wave form preservation or to avoid signal cancellation caused by the used downmixing method (for example, the downmixing method described by equation (1) above).

7.3.1 Partial Wave Form Preservation

In the following, it is described how a partial wave form preservation can be achieved. For example, the calculated residual (for example, the residual res according to equation (4)) is transmitted full-band or band-limited to provide partial wave form preservation within the residual bandwidth. Residual parts, which are detected as perceptually irrelevant by the psychoacoustic model may, for example, be quantized to zero (for example, when providing the encoded representation 112 on the basis of the residual signal 126). This includes, but is not limited to, reducing the transmitted residual bandwidth at runtime (which may be considered as varying an amount of residual signal which is included into the encoded representation). This system may also allow band-pass-style deletion of residual signal parts, as missing signal energy will be reconstructed by the decoder (for example, by the multi-channel audio decoder 200 or the multi-channel audio decoder 300). Thus, for example, residual coding may be only applied to tonal components of the signal, preserving their phase-relations, whereas background noise can be parametrically coded to reduce the residual bitrate. In other words, the residual signal 126 may only be included into the encoded representation 112 (for example, by the residual signal processing 130) for frequency bands and/or temporal portions for which the multi-channel audio signal 110 (or at least one of the channel signals of the multi-channel audio signal 110) are found to be tonal. In contrast, the residual signal 126 may not be included into the encoded representation 112 for frequency bands and/or temporal portions for which the multi-channel audio signal 110 (or at least one or more channel signals of the multi-channel audio signal 110) are identified as being noise-like. Thus, an amount of residual signal included into the encoded representation is varied in dependence on the multi-channel audio signal.

7.3.2 Prevention of Signal Cancellation in Downmix

In the following, it will be described how a signal cancellation in the downmix can be prevented (or compensated).

For low bitrate applications, parametric coding (which predominantly or exclusively relies on the parameters 124, describing dependencies between channels of the multi-channel audio signal) instead of wave form preserving coding (which, for example, predominantly relies on the residual signal 126, in addition to the downmix signal 122) is applied. Here, the residual signal 126 is only used to compensate for signal cancellations in the downmix 122, to minimize the bit usage of the residual. As long as no signal cancellations in the downmix 122 are detected, the system runs in parametric mode using decorrelators (at the side of the audio decoder). When signal cancellations occur, for example, for phasing tonal signals, a residual signal 126 is transmitted for the impaired signal parts (for example, frequency bands and/or temporal portions). Thus, the signal energy can be restored by the decoder.

7.4 Decoding Process

7.4.1 Overview

In the decoder (for example, in the multi-channel audio decoder 200 or in the multi-channel audio decoder 300), the transmitted downmix and residual signals (for example, downmix signal 222 or residual signal 226) are decoded by a core decoder and fed into an MPEG surround decoder together with the decoded MPEG surround payload. Residual upmix coefficients for the classic MPS downmix are unchanged, and residual upmix coefficient for the simplified downmix are defined in equations (7) and (8) and/or (9). Additionally, decorrelator outputs and its weighting coefficients are calculated, as for parametric decoding. The residual signal and the decorrelator outputs are weighted and both mixed to the output signal. Therefore, weighting factors are determined by measuring the energies of the residual and decorrelator signals.

In other words, residual upmix factors (or coefficients) may be determined by measuring the energies of the residual and decorrelated signals.

For example, the downmix signal 222 is provided on the basis of the encoded representation 210, and the decorrelated signal 224 is derived from the downmix signal 222 or generated on the basis of parameters included in the encoded representation 210 (or otherwise). The residual upmix coefficients may, for example be derived from the parametric upmix coefficients $u_{d,1}$ and $u_{d,2}$ in accordance with equations (7) and (8) by the decoder, wherein the parametric upmix coefficients $u_{d,1}$ $u_{d,2}$ may be obtained on the basis of the encoded representation 210, for example, directly or by deriving them from spatial data included in the encoded representation 210 (for example, from inter-channel correlation coefficients and inter-channel level difference coefficients, or from inter-object correlation coefficients and inter-object level differences).

Upmixing coefficients for the decorrelator output (or outputs) may be obtained as for conventional MPEG surround decoding. However, weighting factors for weighting the decorrelator output (or decorrelator outputs) may be determined on the basis of the energies of the residual signal (and possibly also on the basis of the energies of the decorrelator signal or signals) such that a weight describing a contribution of the decorrelated signal in the weighted combination is determined in dependence on the residual signal.

7.4.2 Example Implementation

In the following, an example implementation will be described taking reference to FIG. 7. However, it should be noted, that the concept described herein can also be applied in the multi-channel audio decoders 200 or 300 according to FIGS. 2 and 3.

Figure 7:
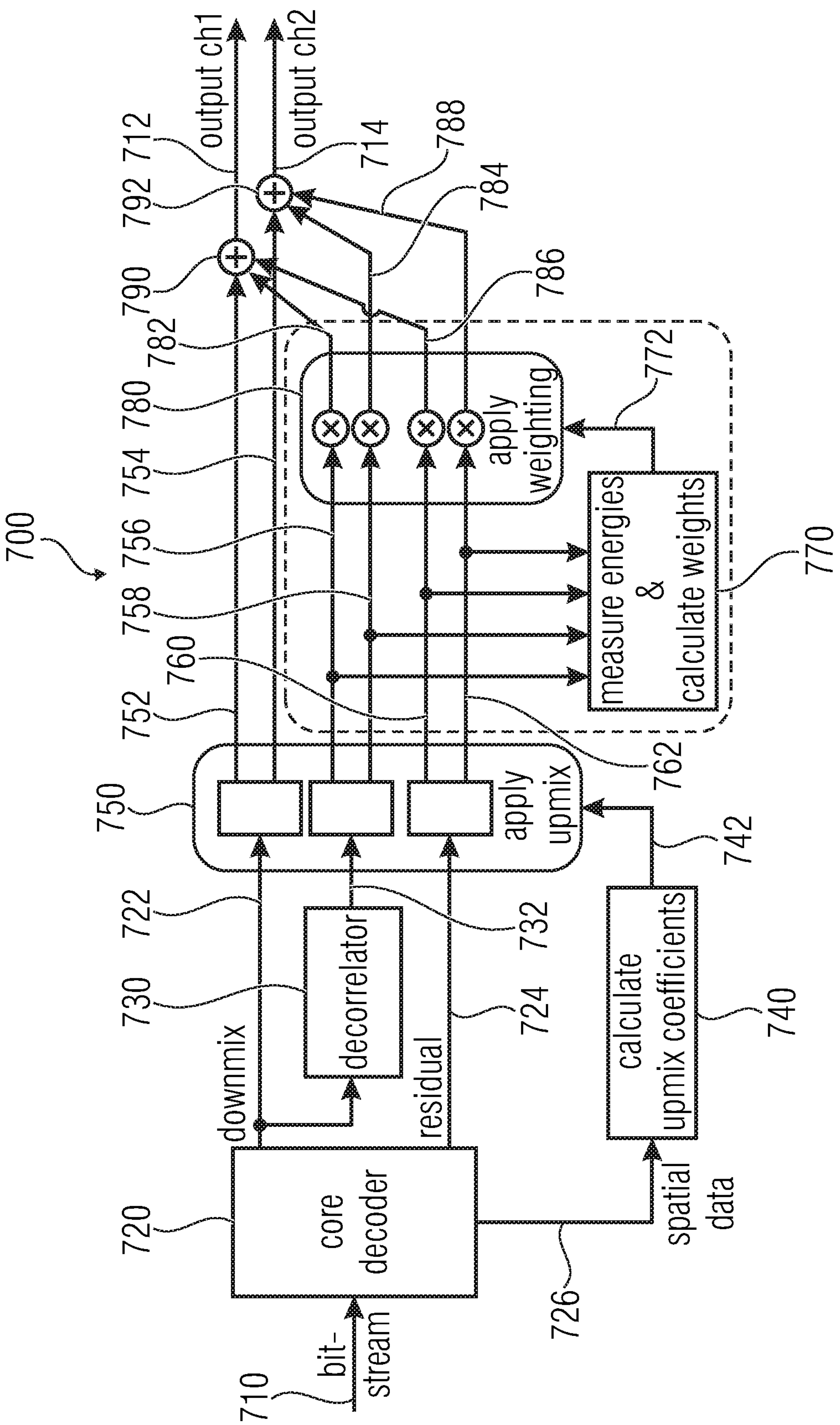
FIG. 7 shows a flow diagram of a decoder, according to an embodiment of the present invention.

FIG. 7 shows a block schematic diagram (or flow diagram) of a decoder (for example, of a multi-channel audio decoder). The decoder according to FIG. 7 is designated with 700 in its entirety. The decoder 700 is configured to receive a bit stream 710 and to provide, on the basis thereof, a first output channel signal 712 and a second output channel signal 714. The decoder 700 comprises a core decoder 720, which is configured to receive the bit stream 710 and to provide, on the basis thereof, a downmix signal 722, a residual signal 724 and spatial data 726. For example, the core decoder 720 may provide, as the downmix signal, a time domain representation or transform domain representation (for example, frequency domain representation, MDCT domain representation, QMF domain representation) of the downmix signal represented by the bit stream 710. Similarly, the core decoder 720 may provide a time domain representation or transform domain representation of the residual signal 724, which is represented by the bit stream 710. Moreover, the core decoder 720 may provide one or more spatial parameters 726, like, for example, one or more inter-channel-correlation parameter, inter-channel-level difference parameters, or the like.

The decoder 700 also comprises a decorrelator 730, which is configured to provide a decorrelated signal 732 on the basis of the downmix signal 722. Any of the known decorrelation concepts may be used by the decorrelator 730. Moreover, the decoder 700 also comprises an upmix coefficient calculator 740, which is configured to receive spatial data 726 and to provide upmix parameters (for example, upmix parameters $u_{dmx,1}$, $u_{dmx,2}$, $u_{dec,1}$ and $u_{dec,2}$). Moreover, the decoder 700 comprises an upmixer 750, which is configured to apply the upmix parameters 742 (also designated as upmix coefficients) which are provided by the upmix coefficient calculator 740 on the basis of the spatial data 726. For example, the upmixer 750 may scale the downmix signal 722 using two downmix-signal upmix coefficients (for example the $u_{dmx,1}$, $u_{dmx,2}$), to obtain two upmixed versions 752, 754 of the downmix signal 722. Moreover, the upmixer 750 is also configured to apply one or more upmix parameters (for example two upmix parameters) to the decorrelated signal 732 provided by the decorrelator 730, to obtain a first upmixed (scaled) version 756 and a second upmixed (scaled) version 758 of the decorrelated signal 732. Moreover, the upmixer 750 is configured to apply one or more upmix coefficients (for example, two upmix coefficients) to the residual signal 724, to obtain a first upmixed (scaled) version 760 and a second upmixed (scaled) version 762 of the residual signal 724.

The decoder 700 also comprises a weight calculator 770, which is configured to measure energies of the upmixed (scaled) versions 756, 758 of the decorrelated signal 752 and of the upmixed (scaled) version 760, 762 of the residual signal 724. Moreover, the weight calculator 770 is configured to provide one or more weighting values 772 to a weighter 780. The weighter 780 is configured to obtain a first upmixed (scaled) and weighted version 782 of the decorrelated signal 732, a second upmixed (scaled) and a weighted version 784 of the decorrelated signal 732, a first upmixed (scaled) and weighted version 786 of the residual signal 724 and a second upmixed (scaled) and weighted version 788 of the residual signal 724 using one or more weighting values 772 provided by the weight calculator 770. The decoder also comprises a first adder 790, which is configured to add up the first upmixed (scaled) version 752 of the downmix signal 720, the first upmixed (scaled) and weighted version 782 of the decorrelated signal 732 and the first upmixed (scaled) and weighted version 786 of the residual signal 724, to obtain the first output channel signal 712. Moreover, the decoder comprises a second adder 792, which is configured to add up the second upmixed version 754 of the downmix signal 720, the second upmixed (scaled) and weighted version 784 of the decorrelated signal 732 and the second upmixed (scaled) and weighted version 788 of the residual signal 724, to obtain the second output channel signal 714.

However, it should be noted, that it is not necessitated that the weighter 780 weights all of the signals 756, 758, 760, 762. For example, in some embodiments it may be sufficient to weight only the signals 756, 758, while leaving the signals 760, 762 unaffected (such that, effectively, the signals 760, 762 are directly applied to the adders 790, 792. Alternatively, however, the weighting of the residual signals 760, 762 may be varied over time. For example, the residual signals may be faded in or faded out. For example, the weighting (or the weighting factors) of the decorrelated signals may be smoothened over time, and the residual signals may be faded in or faded out correspondingly.

Moreover, it should be noted, that the weighting, which is performed by the weighter 780 and the upmixing, which is applied by the upmixer 750, may also be performed as a combined operation, wherein the weight calculation may be performed directly using the decorrelated signal 732 and the residual signal 724.

In the following, some further details regarding the functionality of the decoder 700 will be described.

A combined residual and parametric coding mode may, for example, be signaled in a semi-backwards compatible way, for example, by signaling a residual bandwidth of one parameter band in the bit stream. Thus, a legacy decoder will still pass and decode the bit stream by switching to parametric decoding above the first parameter band. Legacy bit streams using a residual bandwidth of one would not contain residual energy above the first parameter band, leading to a parametric decoding in the proposed new decoder.

However, within a 3D audio codec system, the combined residual and parametric coding may be used in combination with other core decoder tools like a quad channel element, enabling the decoder to explicitly detect legacy bit streams and decode them in regular band-limited residual coding mode. An actual residual bandwidth is not explicitly signaled, as it is determined by the decoder at run time. The calculation of the upmix coefficients is set to parametric mode instead of a residual coding mode. The energies of the weighted decorrelator output $E_{dec}$ and weighted residual signal $E_{res}$ are calculated per hybrid band hb over all time slots ts and upmix channels ch for each frame:

$$E_{dec}(hb) = \sum_{ch} \sum_{ts} \|u_{dec}(hb, ts, ch) \cdot x_{dec}(hb, ts, ch)\| \quad (10)$$

$$E_{res}(hb) = \sum_{ch} \sum_{ts} \|u_{res}(hb, ts, ch) \cdot x_{res}(hb, ts, ch)\| \quad (11)$$

Here, $u_{dec}$ designates a decorrelated signal upmix parameter for a frequency band hb, for a time slot ts and for an upmix channel ch, $$\sum_{ch}$$

designates a sum over upmix channels, and $$\sum_{ts}$$

designates a sum over time slots. $x_{dec}$ designates a value (for example, a complex transform domain value) of the decorrelated signal for a frequency band hb, for a time slot ts and for an upmix channel ch.

The residual signal (for example, the upmixed residual signal 760 or the upmixed residual signal 762) is added to output channels (for example, to output channels 712, 714) with a weight of one. The decorrelator signal (for example the upmixed decorrelator signal 756 or the upmixed decorrelator signal 758) may be weighted with a factor r (for example by the weighter 780) that is calculated as $$r = \sqrt{\left|\frac{E_{dec}(hb) - E_{res}(hb)}{E_{dec}(hb)}\right|} \quad (12)$$

(13)

wherein $E_{dec}$(hb) represents a weighted energy value of the decorrelated signal $x_{dec}$ for a frequency band hb, and wherein $E_{res}$(hb) represents a weighted energy value of the residual signal $x_{res}$ for a frequency band hb.

If no residual (for example, no residual signal 724) has been transmitted, for example, if $E_{res}=0$, r (the factor which may be applied by the weighter 780, and which may be considered as a weighting value 772) becomes 1, which is equivalent to a purely parametric decoding. If the residual energy (for example, the energy of the upmixed residual signal 760 and/or of the upmixed residual signal 762) exceeds the decorrelator energy (for example, the energy of the upmixed decorrelated signal 756 or of the upmixed decorrelated signal 758), for example, if $E_{res}>E_{dec}$, the factor r may be set to zero, thus disabling the decorrelator and enabling partially wave form preserving decoding (which may be considered as residual coding). In the upmixing process, the weighted decorrelator output (for example, signals 782 and 784) and the residual signal (for example, signals 786, 788 or signals 760, 762) are both added to the output channels (for example, signals 712, 714).

In conclusion, this leads to an upmix rule in matrix form $$\begin{pmatrix} ch_1 \\ ch_2 \end{pmatrix} = \begin{bmatrix} u_{dmx,1} & r \cdot u_{dec,1} & \max\{u_{dmx,1}, 0.5\} \\ u_{dmx,2} & r \cdot u_{dec,2} & -\max\{u_{dmx,2}, 0.5\} \end{bmatrix} \cdot \begin{pmatrix} x_{dmx} \\ x_{dec} \\ x_{res} \end{pmatrix} \quad (14)$$

wherein ch1 represents one or more time domain samples or transform domain samples of a first output audio signal, wherein ch2 represents one or more time domain samples or transform domain samples of a second output audio signal, wherein $x_{dmx}$ represents one or more time domain samples or transform domain samples of a downmix signal, wherein $x_{dec}$ represents one or more time domain samples or transform domain samples of a decorrelated signal, wherein $x_{res}$ represents one or more time domain samples or transform domain samples of a residual signal, wherein $u_{dmx,1}$ represents a downmix signal upmix parameter for the first output audio signal, wherein $u_{dmx,2}$ represents a downmix signal upmix parameter for the second output audio signal, wherein $u_{dec,1}$ represents a decorrelated signal upmix parameter for the first output audio signal, wherein $u_{dec,2}$ represents a decorrelated signal upmix parameter for the second output audio signal, wherein max represents a maximum operator, and wherein r represents a factor describing a weighting of the decorrelated signal in dependence on the residual signal.

The upmix coefficients $U_{dmx,1}$, $U_{dmx,2}$, $U_{dec,1}$, $U_{dec,2}$ are calculated as for the MPS two-one-two (2-1-2) parametric mode. For details, reference is made to the above referenced standard of the MPEG surround concept.

To summarize, an embodiment according to the invention creates a concept to provide output channel signals on the basis of a downmix signal, a residual signal and spatial data, wherein a weighting of the decorrelated signal is flexibly adjusted without any significant signaling overhead.

7.5 Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

7.6 Further Embodiment

In the following, another embodiment according to the invention will be described taking reference to FIG. 8, which shows a block schematic diagram of a so-called Hybrid Residual Decoder.

Figure 8:
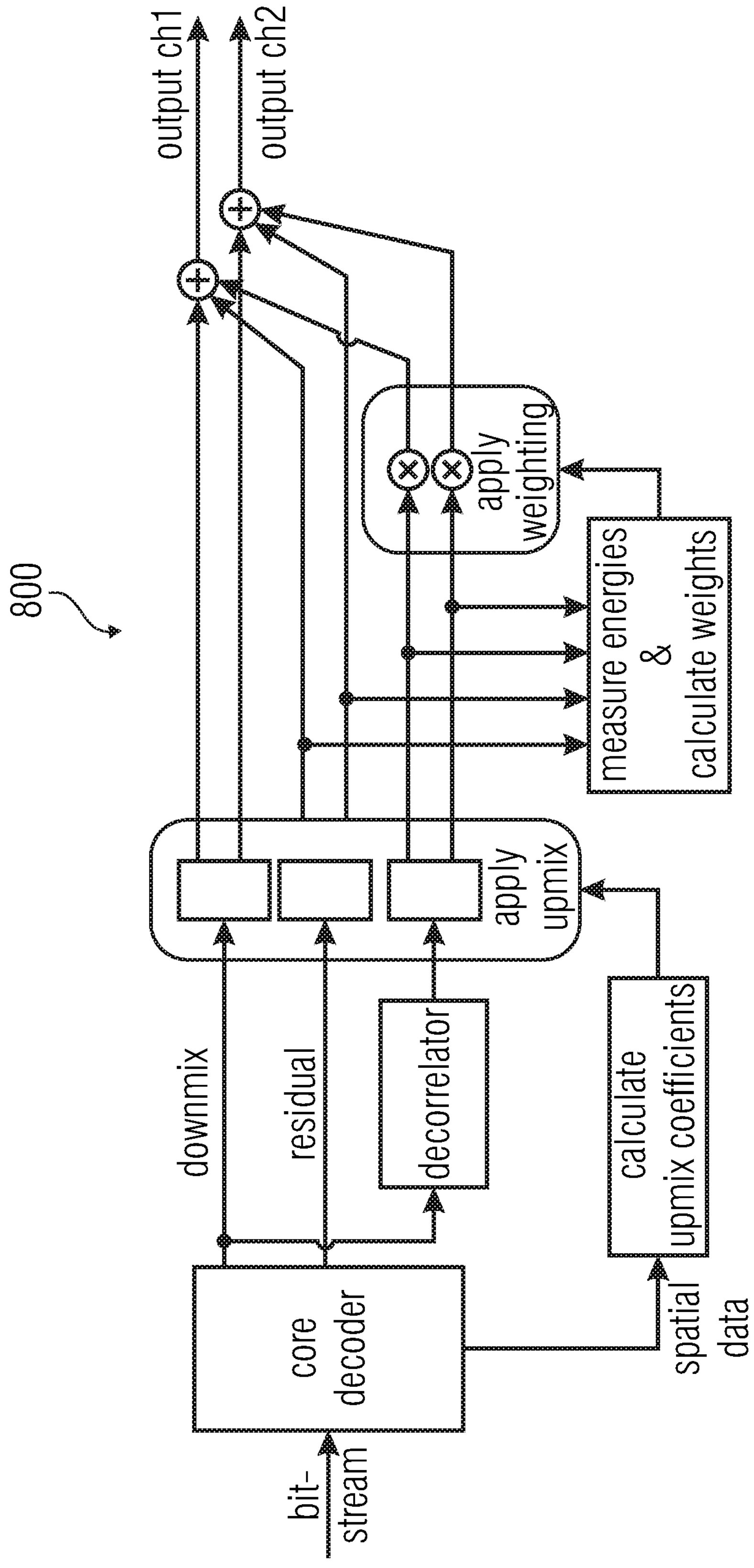
FIG. 8 shows a schematic representation of a Hybrid Residual Decoder.

The Hybrid Residual Decoder 800 according to FIG. 8 is very similar to the Decoder 700 according to FIG. 7, such that reference is made to the above explanations. However, in the Hybrid Residual Decoder 800, an additional weighting (in addition to the application of the upmix parameters) is only applied to the upmixed decorrelated signals (which correspond to the signals 756, 758 in the decoder 700), but not to the upmixed residual signals (which correspond to the signals 760, 762 in the decoder 700). Thus, the weighter in the Hybrid Residual Decoder 800 is somewhat simpler than the weighter in the decoder 700, but is well in agreement, for example, with the weighting according to equation (14).

In the following, the combined Parametric and Residual Decoding (Hybrid Residual Coding) according to FIG. 8 will be explained in some more detail.

However, firstly, an overview will be provided.

In addition to using either decorrelator-based mono-to-stereo upmixing or residual coding as described in ISO/IEC 23003-3, subclause 7.11.1, Hybrid Residual Coding allows a signal dependent combination of both modes. Residual signal and decorrelator output are blended together, using time and frequency dependent weighting factors depending on the signal energies and the spatial parameters, as illustrated in FIG. 8.

In the following, the decoding process will be described.

Hybrid Residual Coding mode is indicated by the syntax elements bsResidualCoding==1 and bsResidualBands==1 in Mps212ConfigQ. In other words, the usage of the Hybrid Residual coding may be signaled using a bitstream element of the encoded representation. The calculation of mix-matrix M2 is performed as if bsResidualCoding==0, following the calculation in ISO/IEC 23003-3, subclause 7.11.2.3. The matrix $$R_2^{l,m}$$

for the decorrelator based part is defined as $$R_2^{l,m} = \begin{bmatrix} H11_{OTT}^{l,m} & H12_{OTT}^{l,m} \\ H21_{OTT}^{l,m} & H22_{OTT}^{l,m} \end{bmatrix}$$

The upmixing process is split up into Downmix, decorrelator output and residual. The upmixed Downmix $u_{dmx}$ is calculated using:

$$R_{2,dmx}^{l,m} = \begin{bmatrix} H11_{OTT}^{l,m} & 0 \\ H21_{OTT}^{l,m} & 0 \end{bmatrix}$$

The upmixed decorrelator output $u_{dec}$ is calculated using:

$$R_{2,dec}^{l,m} = \begin{bmatrix} 0 & H12_{OTT}^{l,m} \\ 0 & H22_{OTT}^{l,m} \end{bmatrix}$$

The upmixed residual signal $u_{res}$ is calculated using:

$$R_{2,res}^{l,m} = \begin{bmatrix} 0 & H12_{RES}^{l,m} \\ 0 & H22_{RES}^{l,m} \end{bmatrix} = \begin{bmatrix} 0 & \max\{0.5, H11_{OTT}^{l,m}\} \\ 0 & -\max\{0.5, H21_{OTT}^{l,m}\} \end{bmatrix}$$

The energies of the upmixed residual signal $E_{res}$ and of the upmixed decorrelator output $E_{dec}$ are calculated per hybrid band as sum over both output channels ch and all timeslots ts and of one frame as:

$$E_{res} = \sum_{ch} \sum_{ts} \|u_{res}(ch, ts)\|$$

$$E_{dec} = \sum_{ch} \sum_{ts} \|u_{dec}(ch, ts)\|$$

The upmixed decorrelator output is weighted using a weighting factor $r_{dec}$ calculated for each hybrid band per frame as:

$$r_{dec} = \begin{cases} 0 & \text{if } E_{res} > E_{dec} \\ 1 & \text{if } E_{res} < \varepsilon \\ \sqrt{\left| \frac{E_{dec} - E_{res} + \varepsilon}{E_{dec} + \varepsilon} \right|} & \text{else} \end{cases}$$

with ε a small number to prevent division by zero (for example, ε=1e−9, or 0<ε<=1e−5). However, in some embodiments, ε may be set to zero (replacing "$E_{res}$<ε" by "$E_{res}$=0").

All three upmix signals are added to form the decoded output signal.

8. Conclusions

To conclude, embodiments according to the invention create a combined residual and parametric coding.

The present invention creates a method for a signal dependent combination of parametric and residual coding for joint stereo coding, which is based on the USAC unified stereo tool. Instead of using a fixed residual bandwidth, the amount of transmitted residual is determined signal dependently by an encoder, time and frequency variant. On decoder side, the necessitated amount of decorrelation between the output channels is generated by mixing residual signal and decorrelator output. Thus, a corresponding audio coding/decoding system is able to blend between fully parametric coding and wave form preserving residual coding at run time, depending on the encoded signal.

Embodiments according to the invention outperform conventional solutions. For example, in USAC, an MPEG surround two-one-two (2-1-2) system is used for parametric stereo coding, or unified stereo, transmitting a band-limited or full-bandwidth residual signal for partial wave form preservation. If a band-limited residual is transmitted, parametric upmixing with the use of decorrelators is applied above the residual bandwidth. The drawback of this method is, that the residual bandwidth is set to a fixed value at the encoder initialization.

In contrast, embodiments according to the invention allow for a signal dependent adaptation of the residual bandwidth or switching to parametric coding. Moreover, if the downmixing process in parametric coding mode produces signal cancellations for ill-conditioned phase relations, embodiments according to the invention allow to reconstruct missing signal parts (for example, by providing an appropriate residual signal). It should be noted, that the simplified downmix method produces less signal cancellations than the classic MPS downmix for parametric coding. However, while the conventional simplified downmix cannot be used for partial wave form preservation, since no residual signal is defined in USAC, embodiments according to the invention allow for a wave form reconstruction (for example, a selective partial wave form reconstruction for signal portions in which partial wave form reconstruction appears to be important).

To further conclude, embodiments according to the invention create an apparatus, a method or a computer program for audio encoding or decoding as described herein.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A multi-channel audio decoder for providing at least two output audio signals on the basis of an encoded representation, wherein the multi-channel audio decoder is configured to acquire one of the at least two output audio signals on the basis of a downmix signal, a decorrelated signal and a residual signal using a weighted combination of the downmix signal, the decorrelated signal and the residual signal, wherein the downmix signal, the decorrelated signal and the residual signal are determined by the multi-channel audio decoder on the basis of the encoded representation;

wherein the multi-channel audio decoder is configured to determine a weighting of the decorrelated signal in the weighted combination in dependence on the residual signal and in dependence on the decorrelated signal, wherein the multi-channel audio decoder is configured to put a comparatively higher weight on the decorrelated signal if the residual signal is comparatively weak, and to put a comparatively smaller weight on the decorrelated signal if the residual signal is comparatively strong;

wherein the multi-channel audio decoder is configured to variably adjust a weighting of the residual signal in the weighted combination in dependence on the downmix signal.

2. A multi-channel audio decoder for providing at least two output audio signals on the basis of an encoded representation, wherein the multi-channel audio decoder is configured to acquire one of the at least two output audio signals on the basis of a downmix signal, a decorrelated signal and a residual signal using a weighted combination of the downmix signal, the decorrelated signal and the residual signal, wherein the downmix signal, the decorrelated signal and the residual signal are determined by the multi-channel audio decoder on the basis of the encoded representation;

wherein the multi-channel audio decoder is configured to determine a weighting of the decorrelated signal in the weighted combination in dependence on the residual signal and in dependence on the decorrelated signal, wherein the multi-channel audio decoder is configured to put a comparatively higher weight on the decorrelated signal if the residual signal is comparatively weak, and to put a comparatively smaller weight on the decorrelated signal if the residual signal is comparatively strong; and wherein the multi-channel audio decoder is configured to variably adjust a weighting of the residual signal in the weighted combination in dependence on the decorrelated signal.

3. A method for providing at least two output audio signals on the basis of an encoded representation, the method comprising:

obtaining a downmix signal, a decorrelated signal and a residual signal on the basis of the encoded representation;

acquiring one of the at least two output audio signals on the basis of the downmix signal, the decorrelated signal and the residual signal using a weighted combination of the downmix signal, the decorrelated signal and the residual signal, determining a weighting of the decorrelated signal in the weighted combination in dependence on the residual signal and in dependence on the decorrelated signal, putting a comparatively higher weight on the decorrelated signal if the residual signal is comparatively weak, and putting a comparatively smaller weight on the decorrelated signal if the residual signal is comparatively strong; and wherein a weight of the residual signal in the weighted combination is variably adjusted in dependence on the downmix signal.

4. A non-transitory digital storage medium having a computer program stored thereon to perform the method for providing at least two output audio signals based on an encoded representation according to claim 3 when said computer program is run by a computer.

5. A method for providing at least two output audio signals on the basis of an encoded representation, the method comprising:

obtaining a downmix signal, a decorrelated signal and a residual signal on the basis of the encoded representation;

acquiring one of the at least two output audio signals on the basis of the downmix signal, the decorrelated signal and the residual signal using a weighted combination of the downmix signal, the decorrelated signal and the residual signal, determining a weighting of the decorrelated signal in the weighted combination in dependence on the residual signal and in dependence on the decorrelated signal, putting a comparatively higher weight on the decorrelated signal if the residual signal is comparatively weak, and putting a comparatively smaller weight on the decorrelated signal if the residual signal is comparatively strong; and wherein a weight of the residual signal in the weighted combination is variably adjusted in dependence on the decorrelated signal.

6. A non-transitory digital storage medium having a computer program stored thereon to perform the method for providing at least two output audio signals based on an encoded representation according to claim 5 when said computer program is run by a computer.

* * * * *